US007639470B2

(12) United States Patent
Saito et al.

(10) Patent No.: US 7,639,470 B2
(45) Date of Patent: Dec. 29, 2009

(54) VARISTOR ELEMENT

(75) Inventors: Yo Saito, Tokyo (JP); Dai Matsuoka, Tokyo (JP); Izuru Soma, Tokyo (JP); Hideaki Sone, Tokyo (JP)

(73) Assignee: TDK Corporation, Tokyo (JP)

( * ) Notice: Subject to any disclaimer, the term of this patent is extended or adjusted under 35 U.S.C. 154(b) by 357 days.

(21) Appl. No.: 11/605,447

(22) Filed: Nov. 29, 2006

(65) Prior Publication Data

US 2007/0146954 A1 Jun. 28, 2007

(30) Foreign Application Priority Data

Dec. 14, 2005 (JP) ........................... P2005-360739
Mar. 31, 2006 (JP) ........................... P2006-098195

(51) Int. Cl.
*H01C 1/00* (2006.01)
*H02H 7/10* (2006.01)

(52) U.S. Cl. ........................... 361/127; 338/20; 338/21

(58) Field of Classification Search ................. 361/127; 338/21, 20

See application file for complete search history.

(56) References Cited

U.S. PATENT DOCUMENTS 3,211,901 A * 10/1965 Comley, Jr. et al. ......... 708/845
4,296,002 A * 10/1981 Sokoly et al. ............ 252/518.1
5,034,709 A * 7/1991 Azumi et al. ............... 333/184
5,999,398 A * 12/1999 Makl et al. .................. 361/302
6,232,144 B1 * 5/2001 McLoughlin ............... 438/104
6,346,871 B1 * 2/2002 Ogasawara et al. ........... 338/21
6,873,513 B2 * 3/2005 Anthony ..................... 361/118

FOREIGN PATENT DOCUMENTS

JP A-2002-057066 2/2002
JP A 2002-246207 8/2002
JP A-2002-305103 10/2002
JP A-2003-347109 12/2003
JP A-2004-172366 6/2004
JP A-2005-260137 9/2005

* cited by examiner

*Primary Examiner*—Stephen W Jackson
*Assistant Examiner*—Zeev Kitov
(74) *Attorney, Agent, or Firm*—Oliff & Berridge, PLC

(57) ABSTRACT

A varistor element comprises a varistor element body, a plurality of inner electrode pairs, a connecting conductor, and a plurality of terminal electrodes. The varistor element body has first and second main faces opposing each other. Each inner electrode pair has first and second inner electrodes. The first and second inner electrodes are arranged so as to oppose each other at least partly within the varistor element body. The connecting conductor is arranged on the first main face so as to electrically connect the first inner electrodes in a predetermined inner electrode pair in the plurality of inner electrode pairs to each other. The terminal electrodes are provided so as to correspond to the second inner electrodes in the plurality of inner electrode pairs, and are arranged on the second main face so as to electrically connect with the second inner electrodes.

9 Claims, 26 Drawing Sheets

VARISTOR ELEMENT

BACKGROUND OF THE INVENTION

1. Field of the Invention

The present invention relates to a varistor element.

2. Related Background Art

Known as this kind of varistor element is one comprising a varistor element body having a varistor layer exhibiting a nonlinear voltage-current characteristic and a pair of inner electrodes arranged so as to hold the varistor layer therebetween, and a pair of terminal electrodes positioned at respective end portions of the varistor element body and connected to their corresponding inner electrodes in a plurality of inner electrodes.

SUMMARY OF THE INVENTION

Demands for high-density mounting of electronic devices such as varistor elements have been becoming severer as electronic devices such as DSC (Digital Still Camera), DVC (Digital Video Camera), PDA (Personal Digital Assistant), notebook PC, and cellular phones have become smaller. For satisfying the demands for high-density mounting, turning the packaging of electronic devices into a ball grid array package (hereinafter simply referred to as BGA package) has been considered. In a BGA package, a number of solder bumps are arranged in a grid on the rear face thereof. The solder bumps are caused to reflow while being overlaid on their corresponding pads on a mounting substrate, whereby the BGA package is mounted to the mounting substrate.

When a varistor element has a structure corresponding to the BGA package, the solder bumps and terminal electrodes are positioned on the rear side opposing the mounting substrate, which makes it difficult to identify the mounting direction of the varistor element. When mounted in a wrong mounting direction, the varistor element fails to function normally.

It is an object of the present invention to provide a varistor element which can be mounted appropriately and easily even when constructed so as to correspond to the BGA package.

In one aspect, the present invention provides a varistor element comprising a varistor element body having first and second main faces opposing each other, a plurality of inner electrode pairs having first and second inner electrodes disposed within the varistor element body so as to oppose each other at least partly, a connecting conductor arranged on the first main face so as to electrically connect the first inner electrodes of a predetermined inner electrode pair in the plurality of inner electrode pairs to each other, and a plurality of terminal electrodes arranged on the second main face so as to correspond to the second inner electrodes of the plurality of inner electrode pairs and electrically connect with the second inner electrodes.

Since a plurality of terminal electrodes are arranged on the second main face, the varistor element in accordance with this aspect of the present invention can be mounted while in a state where the second main face opposes a mounting component (e.g., electronic component or mounting substrate), whereby a structure corresponding to the BGA package is realized. Since the connecting conductor is arranged on the first main face so as to electrically connect the first inner electrodes in a predetermined inner electrode pair in the plurality of inner electrode pairs to each other, a region functioning as a varistor exists at a position corresponding to the connecting conductor. Therefore, the connecting conductor functions as a mark for identifying the mounting direction of the varistor element, whereby the varistor element can be mounted appropriately and easily. This aspect of the present invention has no need to provide a mark for identifying the mounting direction of the varistor element, and thus does not increase the manufacturing cost of the varistor element.

Preferably, the varistor element body has a square form when seen in a direction perpendicular to the first and second main faces. The invention is particularly effective in this case, since the mounting direction of the varistor element is hard to identify according to the form of the varistor element body.

Preferably, the plurality of terminal electrodes are two-dimensionally arranged in n rows by n columns (where n is an even number of 2 or greater).

Preferably, the first inner electrode is led to the first main face, while the portion led to the first main face is connected to the connecting conductor physically and electrically; and the second inner electrode is led to the second main face, while the portion led to the second main face is connected to the terminal electrode physically and electrically.

Preferably, a varistor layer formed with the first inner electrode and a varistor layer formed with the second inner electrode are laminated in the varistor element body, while the first and second main faces extend in a direction parallel to the laminating direction of the varistor layers and perpendicular to the first and second inner electrodes.

In another aspect, the present invention provides a varistor element comprising a varistor element body having first and second main faces opposing each other, an inner electrode pair having first and second inner electrodes disposed within the varistor element body so as to oppose each other at least partly, an inner conductor arranged within the varistor element body, a connecting conductor arranged on the first main face so as to electrically connect the first inner electrode in the inner electrode pair to the inner conductor, a first terminal electrode arranged on the second main face so as to electrically connect with the second inner electrode, and a second terminal electrode arranged on the second main face so as to electrically connect with the inner conductor.

Since the first and second terminal electrodes are arranged on the second main face, the varistor element in accordance with this aspect of the present invention can be mounted while in a state where the second main face opposes a mounting component (e.g., electronic component or mounting substrate), whereby a structure corresponding to the BGA package is realized. Since the connecting conductor is arranged on the first main face so as to electrically connect the first inner electrode in the inner electrode pair to the inner conductor, a region functioning as a varistor exists at a position corresponding to the connecting conductor in the varistor element in accordance with this aspect of the present invention. Therefore, the connecting conductor functions as a mark for identifying the mounting direction of the varistor element, whereby the varistor element can be mounted appropriately and easily. This aspect of the present invention has no need to provide a mark for identifying the mounting direction of the varistor element, and thus does not increase the manufacturing cost of the varistor element.

Preferably, the varistor element body has a square form when seen in a direction perpendicular to the first and second main faces. The invention is particularly effective in this case, since the mounting direction of the varistor element is hard to identify according to the outer form of the varistor element body.

Preferably, the first and second terminal electrodes are two-dimensionally arranged in n rows by n columns (where n is an even number of 2 or greater) while alternating with each other in the row and column directions.

Preferably, the first inner electrode and one end of the inner conductor are led to the first main face, while the portions led to the first main surface are connected to the connecting conductor physically and electrically; the second inner electrode is led to the second main face, while the portion led to the second main face is connected to the first terminal electrode physically and electrically; and the other end of the inner conductor is led to the second main face, while the portion led to the second main face is connected to the second terminal electrode physically and electrically.

Preferably, the varistor element body is a multilayer body in which a plurality of varistor layers formed with the first and second inner electrodes and inner conductor are laminated, whereas the first and second main faces expand in a direction extending along the laminating direction of the varistor layers and intersecting with the first and second inner electrodes and inner conductor.

In still another aspect, the present invention provides a varistor element comprising a varistor element body having first and second main faces opposing each other, an inner electrode pair having first and second inner electrodes disposed within the varistor element body so as to oppose each other at least partly, a pair of inner conductors arranged within the varistor element body, a connecting conductor arranged on the first main face so as to electrically connect the first inner electrode in the inner electrode pair to the inner conductor, a first terminal electrode arranged on the second main face so as to electrically connect with the second inner electrode, and a second terminal electrode arranged on the second main face so as to electrically connect with the inner conductor, wherein the first and second terminal electrodes are two-dimensionally arranged in 2 rows by 2 columns while alternating with each other in the row and column directions.

This aspect of the present invention can provide a varistor element which can be mounted appropriately and easily even when constructed so as to correspond to the BGA package.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, the same constituents or those having the same functions will be referred to with the same numerals without repeating their overlapping descriptions. The embodiments employ the present invention in a multilayer chip varistor.

First Embodiment

Figure 1:
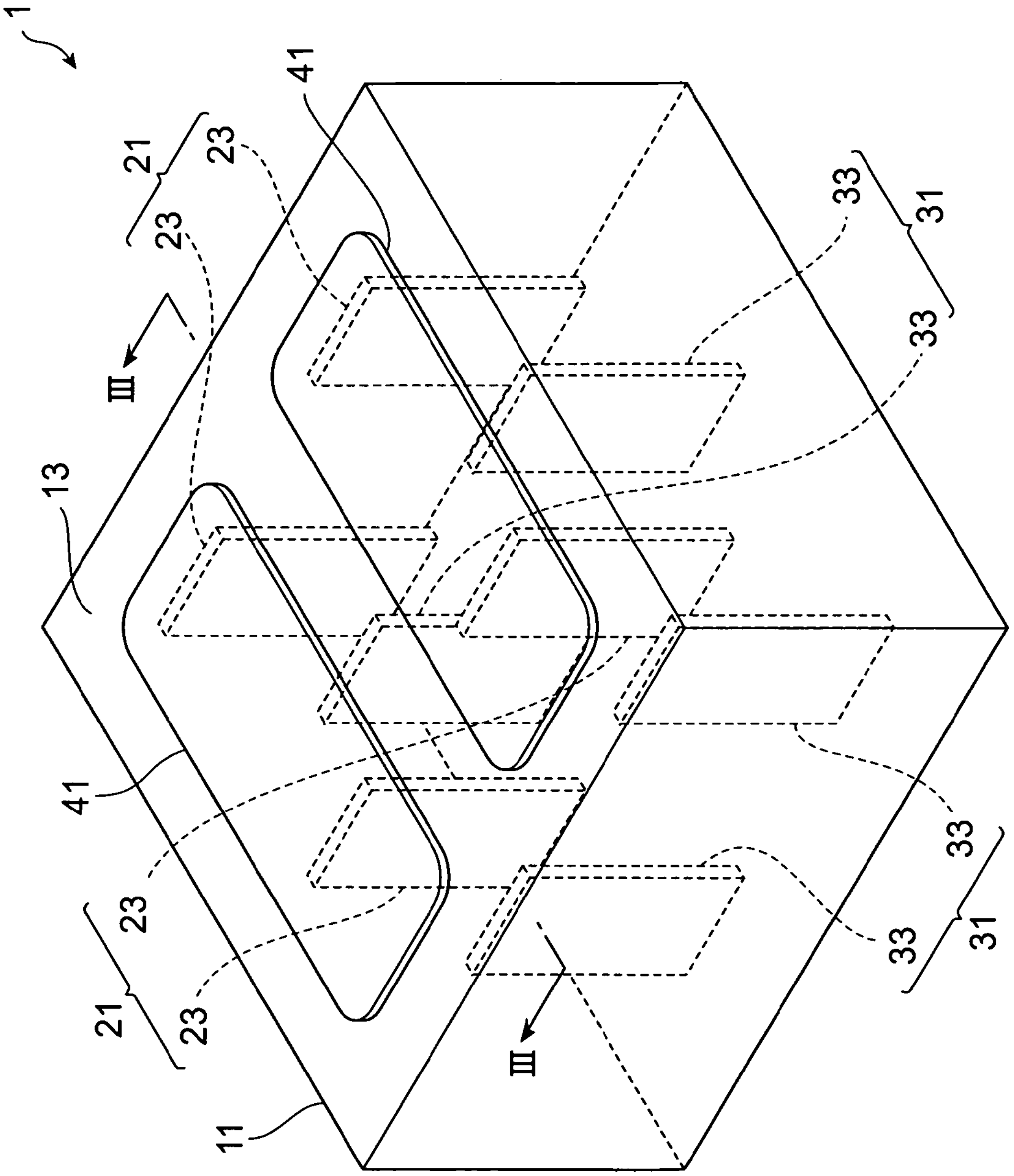
FIG. 1 is a perspective view showing the multilayer chip varistor in accordance with a first embodiment.
Figure 2:
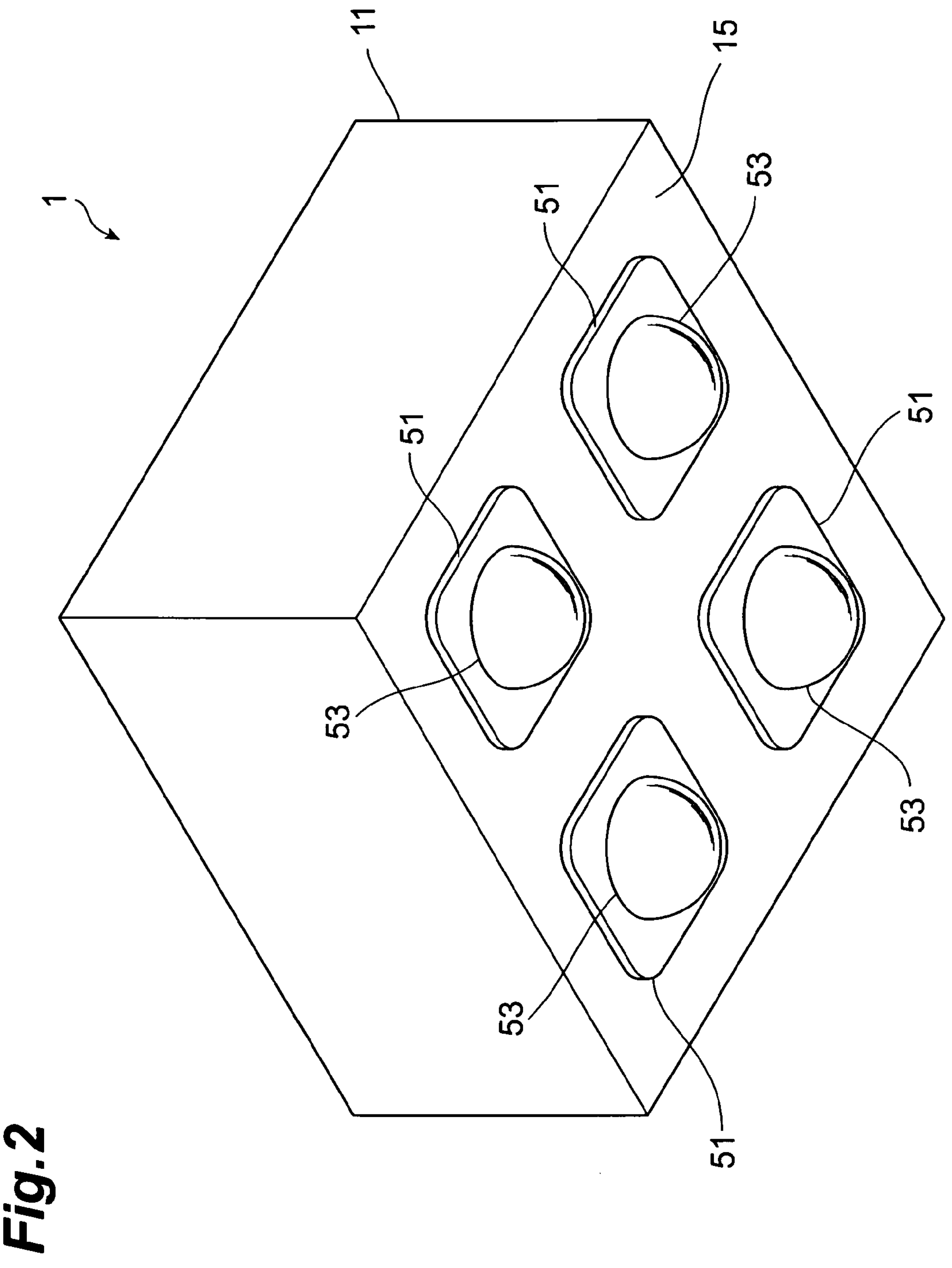
FIG. 2 is a perspective view showing the multilayer chip varistor in accordance with the first embodiment.
Figure 3:
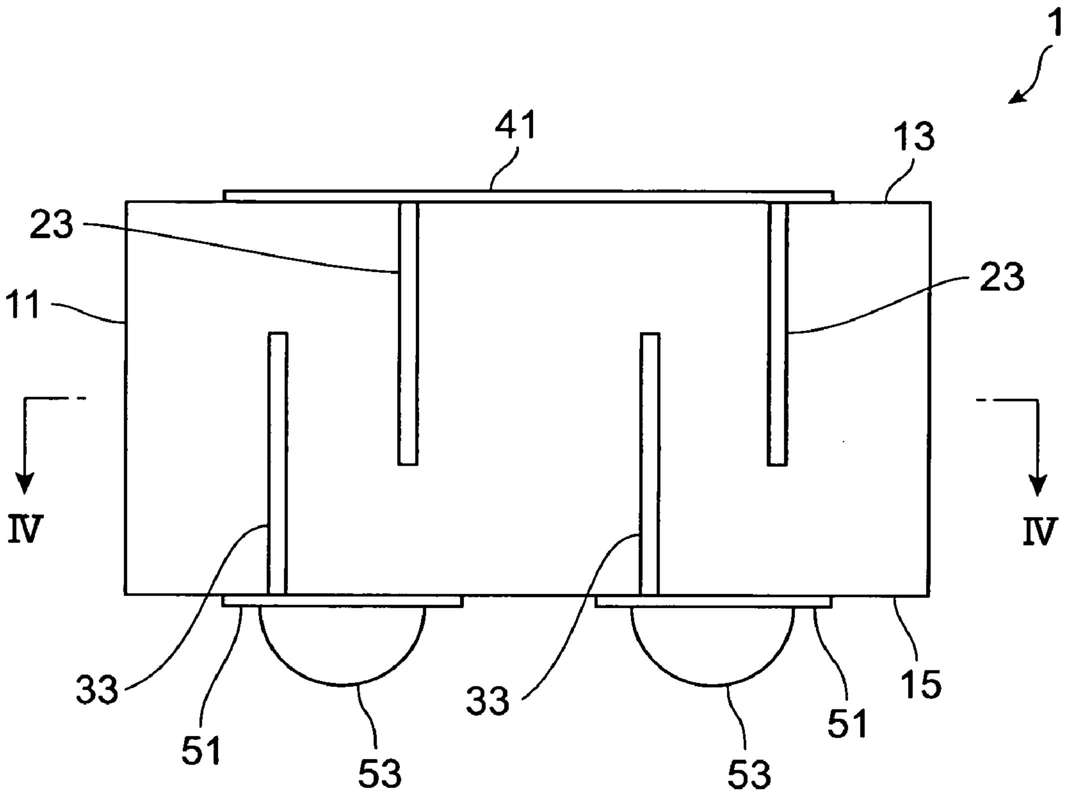
FIG. 3 is a view explaining a cross-sectional structure taken along the line III-III of FIG. 1.
Figure 4:
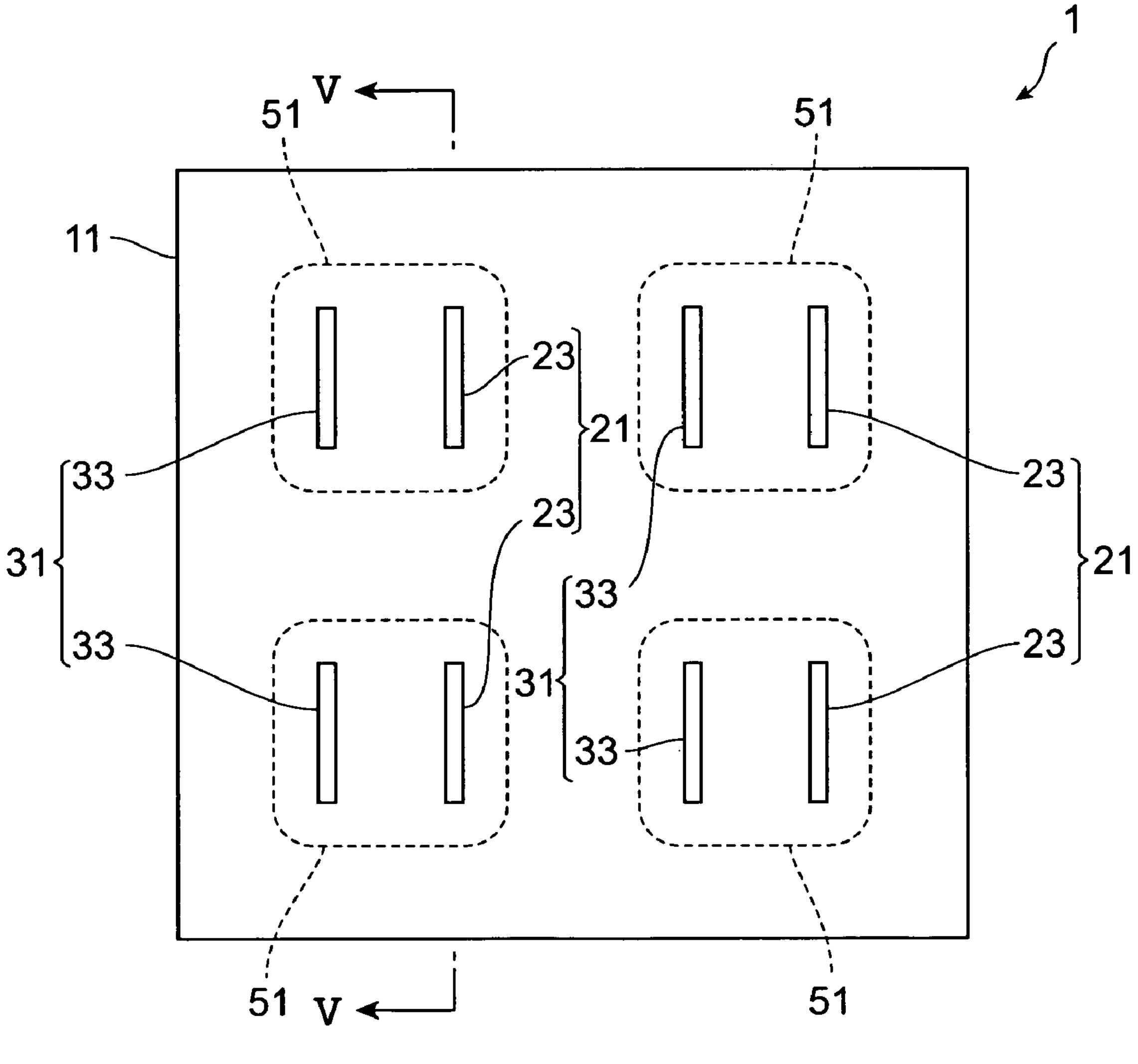
FIG. 4 is a view explaining a cross-sectional structure taken along the line IV-IV of FIG. 3.
Figure 5:
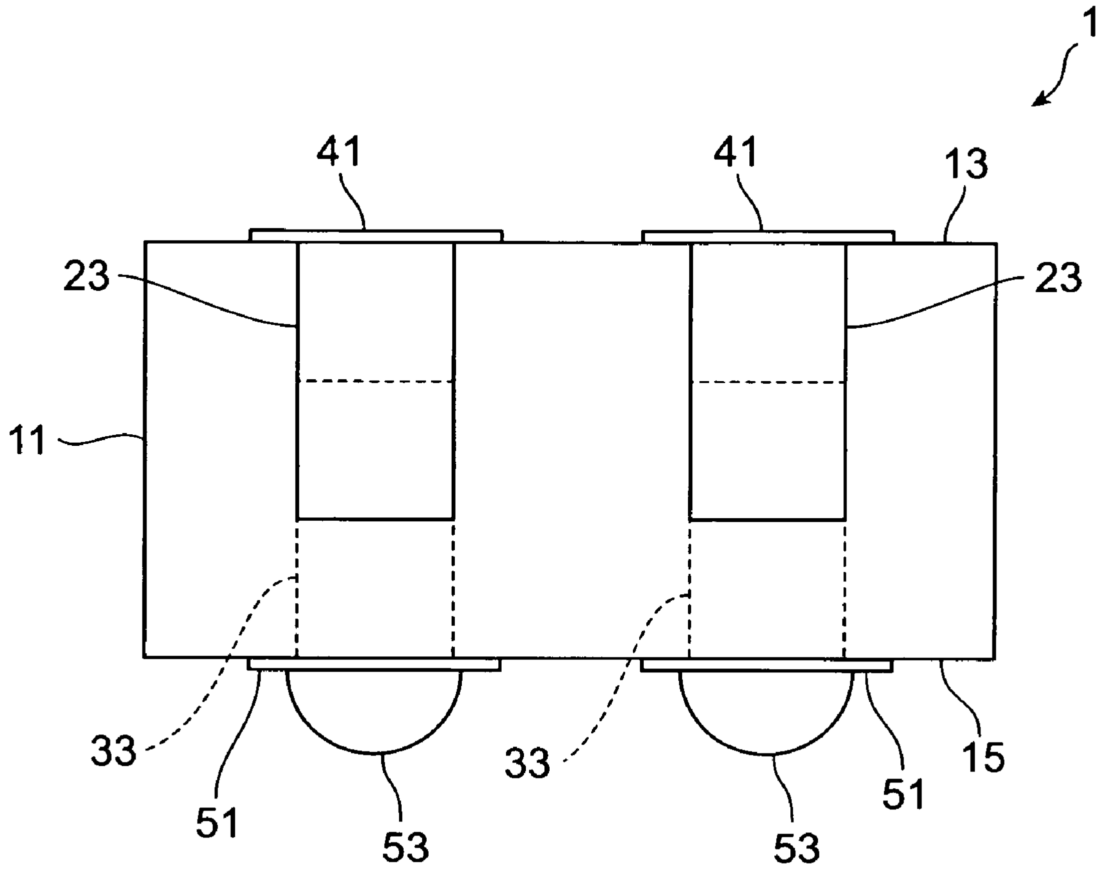
FIG. 5 is a view explaining a cross-sectional structure taken along the line V-V of FIG. 4.

The structure of a multilayer chip varistor in accordance with a first embodiment will be explained with reference to FIGS. 1 to 5. FIGS. 1 and 2 are perspective views showing the multilayer chip varistor in accordance with the first embodiment. FIG. 3 is a view explaining a cross-sectional structure taken along the line III-III of FIG. 1. FIG. 4 is a view explaining a cross-sectional structure taken along the line IV-IV of FIG. 3. FIG. 5 is a view explaining a cross-sectional structure taken along the line V-V of FIG. 4.

As shown in FIGS. 1 to 5, the multilayer chip varistor 1 comprises a varistor element body 11, a plurality of (2 in the first embodiment) connecting conductors 41, and a plurality of (4 in the first embodiment) terminal electrodes 51.

The varistor element body 11 is shaped like a substantially rectangular plate. The length, width, and thickness of the varistor element body 11 are set to about 1 mm, about 1 mm, and about 0.5 mm, respectively, for example. The varistor element body 11 has a first main face 13 and a second main face 15 which oppose each other. The first main face 13 and second main face 15 are square. Namely, the varistor element body 11 has a square form when seen in a direction perpendicular to the first main face 13 and second main face 15.

The varistor element body 11 is constructed as a multilayer body in which a plurality of varistor layers exhibiting a nonlinear voltage-current characteristic (hereinafter referred to as "varistor characteristic") are laminated. In the actual multilayer chip varistor 1, the plurality of varistor layers are integrated to such an extent that their boundaries are indiscernible. The varistor layers contain ZnO (zinc oxide) as a principal component and contain as accessory components single metals, such as rare-earth metals, Co, IIIb elements (B, Al, Ga, In), Si, Cr, Mo, alkali metal elements (K, Rb, Cs), and alkaline earth metals (Mg, Ca, Sr, Ba), or oxides of them. In the first embodiment, the varistor layers contain Pr, Co, Cr, Ca, Si, K, Al, and the like as accessory components.

In the first embodiment, Pr is used as a rare-earth metal. Pr becomes a material for exhibiting a varistor characteristic. Pr is used because of its excellent voltage-current nonlinearity and its small variations in characteristics at the time of mass-production.

In the first embodiment, Ca is used as an alkaline-earth metal element. Ca becomes a material for regulating the sintering property of the ZnO-based varistor material and improving the resistance to humidity. Ca is used for improving the voltage-current nonlinearity.

The ZnO content in the varistor layers is not restricted in particular, but is typically 99.8 to 69.0 mass % when the material constituting the varistor layers is 100 mass % in total. The thickness of each varistor layer is about 5 to 60 μm, for example.

In the varistor element body 11, a plurality of (2 each in the first embodiment) first inner electrode layers 21 and second inner electrode layers 31 are arranged. The first inner electrode layers 21 and second inner electrode layers 31 are arranged such that at least one varistor layer is interposed therebetween.

As shown in FIGS. 3 to 5, each first inner electrode layer 21 includes a plurality of (2 in the first embodiment) first inner electrodes 23. Each first inner electrode 23 has a substantially rectangular form. At least a portion of one first inner electrode 22 opposes one second inner electrode 33, which will be explained later, with a varistor layer interposed therebetween. The first inner electrodes 23 included in the same first inner electrode layer 21 are positioned with a predetermined gap therebetween so as to be electrically insulated from each other while each being separated by a predetermined distance from a side face parallel to the laminating direction of varistor layers (hereinafter simply referred to as "laminating direction"). Each first inner electrode 23 is led to the first main face 13 so as to have one end reaching the first main face 13.

As shown in FIGS. 3 to 5, each second inner electrode layer 31 includes a plurality of (2 in the first embodiment) second inner electrodes 33. Each second inner electrode 33 has a substantially rectangular form. At least a portion of one second inner electrode 33 opposes one first inner electrode 23 with a varistor layer interposed therebetween. The second inner electrodes 33 included in the same second inner electrode layer 31 are positioned with a predetermined gap therebetween so as to be electrically insulated from each other while each being separated by a predetermined distance from a side face parallel to the laminating direction as with the first inner electrodes 23. Each second inner electrode 33 is led to the second main face 15 so as to have one end reaching the second main face 15.

As mentioned above, the first and second inner electrodes 23, 33 are arranged so as to oppose each other at least partly within the varistor element body 11. Consequently, the multilayer chip varistor 1 is equipped with a plurality of (4 in the first embodiment) inner electrode pairs including the first and second inner electrodes 23, 33 arranged so as to oppose each other at least partly within the varistor element body 11.

The first and second inner electrodes 23, 33 contain an electroconductive material. The electroconductive material contained in the first and second inner electrodes 23, 33 is not limited in particular, but preferably is made of Pd or an Ag—Pd alloy. Each of the first and second inner electrodes 23, 33 has a thickness of about 0.5 to 5 μm, for example.

The first main face 13 and second main face 15 extend in a direction parallel to the laminating direction and perpendicular to the first and second inner electrodes 23, 33. The laminating direction is a direction parallel to the opposing direction of the first and second inner electrodes 23, 33 and perpendicular to the first and second inner electrodes 23, 33.

As also shown in FIGS. 3 and 5, each connecting conductor 41 is arranged on the first main face 13 so as to cover the portions led to the first main face 13 in the respective first inner electrodes 23 included in the two inner electrode pairs positioned in a row in the laminating direction among the four inner electrode pairs. The portion of each first inner electrode 23 led to the first main face 13 is connected to its corresponding connecting conductor 41 physically and electrically. Consequently, the connecting conductor 41 electrically connects the first inner electrodes 23 included in the two inner electrode pairs positioned in a row in the laminating direction to each other.

Each connecting conductor 41 has a substantially rectangular form (substantially oblong form in the first embodiment). The length of each longer side, length of each shorter side, and thickness of the connecting conductor 41 are set to about 0.8 mm, about 0.4 mm, and about 2 μm, respectively, for example. The longer-side direction of the connecting conductor 41 is parallel to the laminating direction.

The connecting conductors 41 contain Pt. The connecting conductors 41 are formed by baking an electroconductive paste as will be explained later. Employed as the electroconductive paste is one in which glass frit, an organic binder, and an organic solvent are mixed with a metal powder mainly composed of Pt particles.

As shown in FIGS. 2 and 4, the terminal electrodes 51 are provided so as to correspond to the respective second inner electrodes 33 on the second main face 15, thus being arranged two-dimensionally in n rows by n columns (where parameter n is an even number of 2 or greater). In the first embodiment, the terminal electrodes 51 are two-dimensionally arranged in 2 rows by 2 columns. Each terminal electrode 51 has a substantially rectangular form (substantially square form in the first embodiment). The length of each side and thickness of the terminal electrode 51 are set to about 0.4 mm and about 2 μm, respectively, for example.

As also shown in FIGS. 3 and 5, each terminal electrode 51 is arranged on the second main face 15 so as to cover the portion led to the second main face 15 in its corresponding second inner electrode 33. The portion of the second inner electrode 33 led to the second main face 15 is connected to its corresponding terminal electrode 51 physically and electrically. Consequently, the terminal electrodes 51 are electrically connected to their corresponding second inner electrodes 33.

The terminal conductors 51 contain Pt. The terminal electrodes 51 are formed by baking an electroconductive paste as will be explained later. Employed as the electroconductive paste is one in which glass frit, an organic binder, and an organic solvent are mixed with a metal powder mainly composed of Pt particles. Solder bumps 53 are arranged at the respective terminal electrodes 51.

As mentioned above, each pair of the first inner electrode 23 and second inner electrode are positioned so as to oppose and overlap each other at least partly when seen in the laminating direction. Therefore, a region where the first and second inner electrodes 23, 33 overlap each other in each varistor layer functions as an area exhibiting a varistor characteristic.

Figure 6:
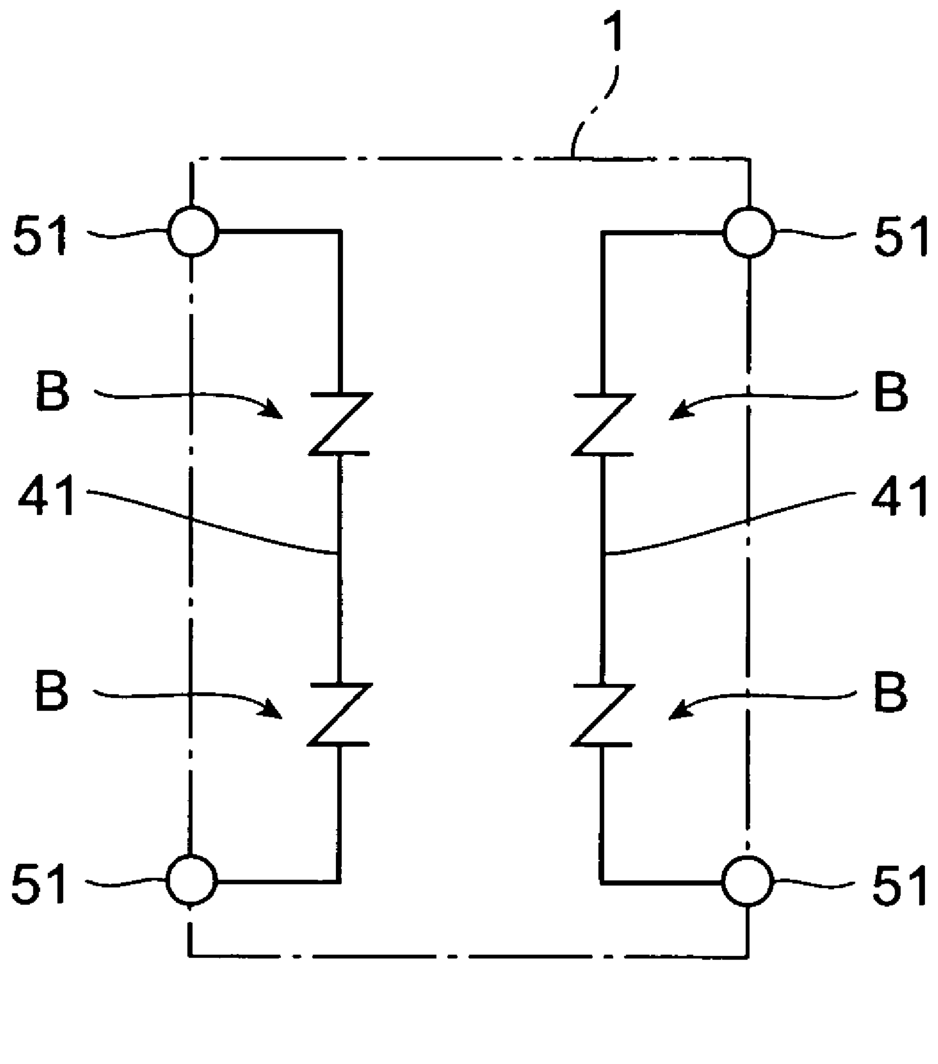
FIG. 6 is a diagram for explaining an equivalent circuit of the multilayer chip varistor in accordance with the first embodiment.

As shown in FIG. 6, the multilayer chip varistor 1 having the structure mentioned above includes two sets of two varistors B connected in series. Each varistor B is constructed by the first inner electrode 23, the second inner electrode 33, and the region of the barrister layer overlaid on the first and second inner electrodes 23, 33.

As mentioned above, the longer-side direction of each connecting conductor 41 is substantially parallel to the laminating direction. Namely, the connecting conductor 41 is formed so as to extend in the laminating direction. In the two varistors B connected in series, one terminal electrode 51 and the other terminal electrode 51 are arranged in a row in the laminating direction. Therefore, the two varistors B connected in series exist between a pair of terminal electrodes 51 arranged in a row in the longer-side direction of the connecting conductor 41.

Figure 7:
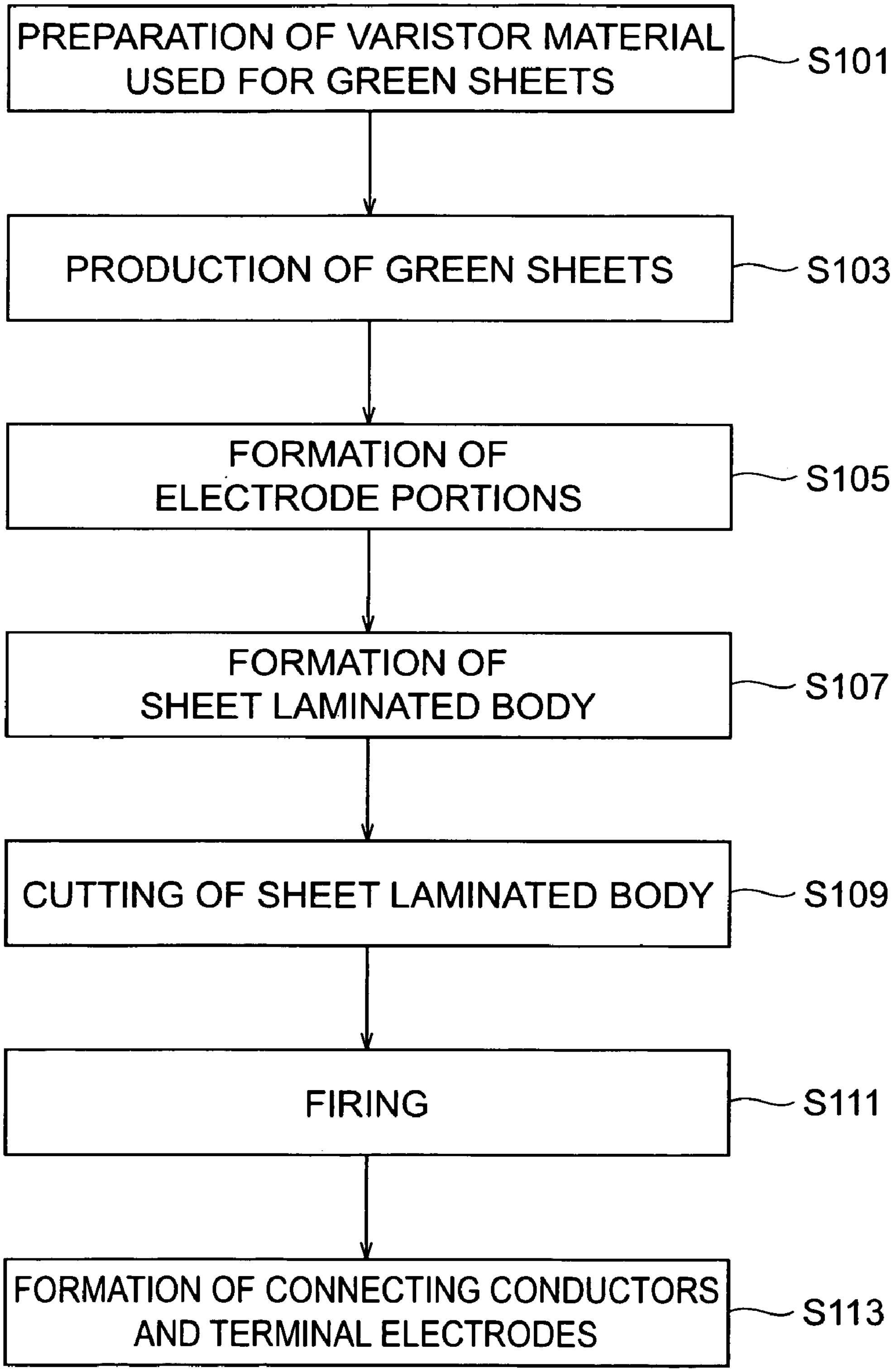
FIG. 7 is a flowchart for explaining a manufacturing process of the multilayer chip varistor in accordance with the first embodiment.
Figure 8:
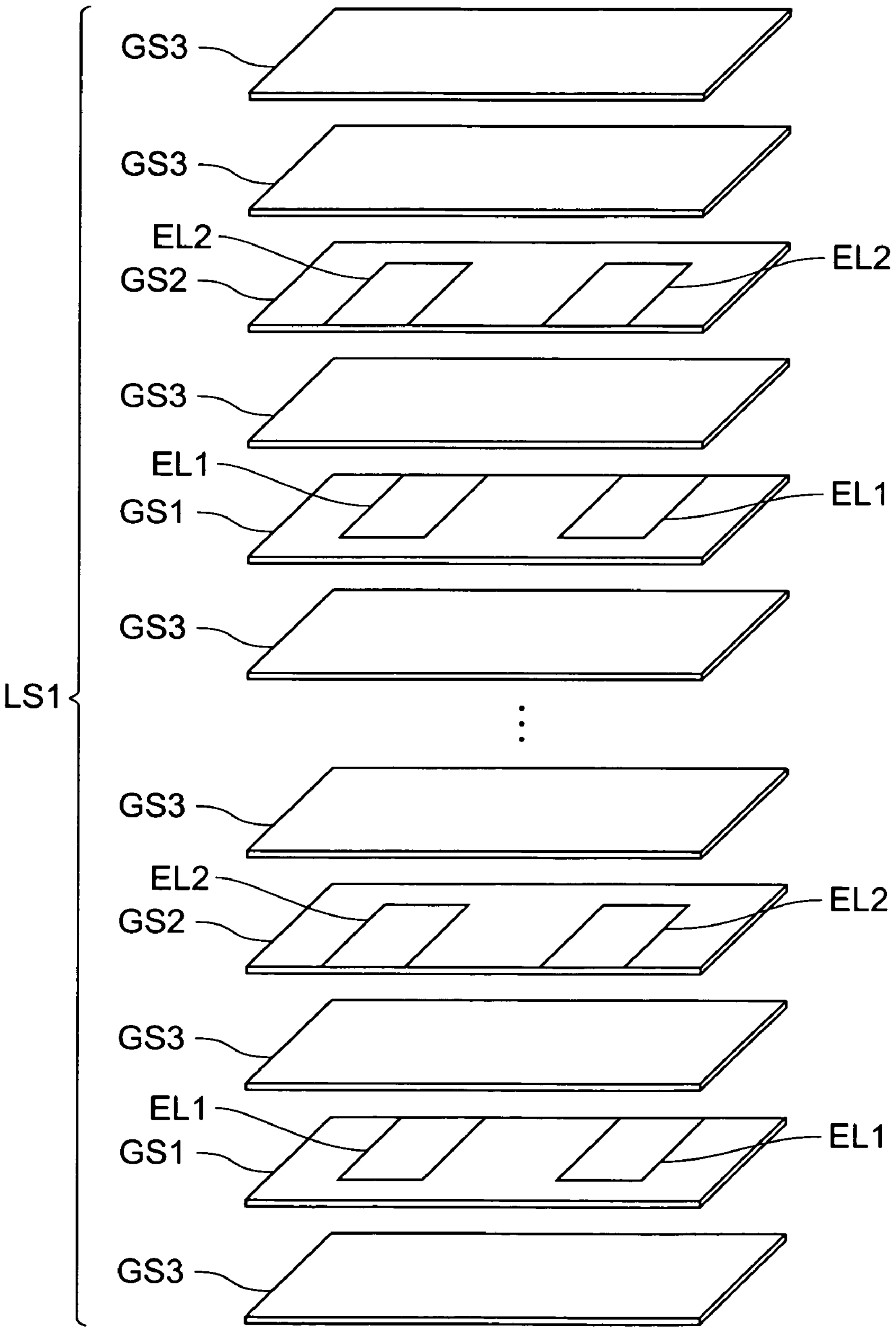
FIG. 8 is a view for explaining the manufacturing process of the multilayer chip varistor in accordance with the first embodiment.

Next, a process of manufacturing the multilayer chip varistor 1 having the above-mentioned structure will be explained with reference to FIGS. 7 and 8. FIG. 7 is a flowchart for explaining the manufacturing process of the multilayer chip varistor in accordance with the first embodiment. FIG. 8 is a flowchart for explaining the manufacturing process of the multilayer chip varistor in accordance with the first embodiment.

First, a varistor material is prepared by weighing each of ZnO as a principal component forming the varistor layers, and the additives of small amount, such as metals or oxides of Pr, Co, Cr, Ca, Si, K, and Al at a predetermined ratio and thereafter mixing them (step S101). Thereafter, an organic binder, an organic solvent, an organic plasticizer, and the like are added to the varistor material, and they are mixed and pulverized for about 20 hr by using a ball mill or the like, so as to yield a slurry.

The slurry is applied onto film, for example, of polyethylene terephthalate by a known method, such as the doctor blade method, and then dried to form membranes in the thickness of about 30 μm. The membranes obtained are peeled off from the polyethylene terephthalate film to obtain green sheets (step S103).

Next, the green sheet is formed with a plurality of electrode portions (by the number corresponding to the number of divided chips which will be explained later) corresponding to the first inner electrodes 23 (step S105). Similarly, a different green sheet is formed with a plurality of electrode portions (by the number corresponding to the number of divided chips which will be explained later) corresponding to the second inner electrodes 33 (step S105). The electrode portions corresponding to the first and second inner electrodes 23, 33 are formed by printing an electroconductive paste, in which a metal powder mainly composed of Pd particles, an organic binder, and an organic solvent are mixed, by a printing method such as screen printing and drying the printed paste.

Next, the green sheets formed with the electrode portions and green sheets formed with no electrode portions are laminated in a predetermined order, so as to form a sheet multilayer body (step S107). Thus obtained sheet multilayer body is cut into chips, for example, so as to yield a plurality of divided green bodies LS1 (see FIG. 8) (step S109). In thus obtained green body LS1, green sheets GS1 formed with electrode portions EL1 corresponding to the first inner electrodes 23, green sheets GS2 formed with electrode portions EL2 corresponding to the second inner electrodes 33, and green sheet GS3 formed with no electrode portions EL1, EL2 are laminated in a predetermined order. A plurality of green sheets GS3 formed with no electrode portions EL1, EL2 may be laminated at each place if necessary.

Next, the green body LS1 is debindered by heat treatment at about 180 to 400° C. for about 0.5 to 24 hr, and then fired at about 850 to 1400° C. for about 0.5 to 8 hr (step S111), so as to yield a varistor element body 11. This firing turns the green sheets GS1 to GS3 in the green body LS1 into varistor layers. The electrode portions EL1 become the first inner electrodes 23. The electrode portions EL2 become the second inner electrodes 33.

Next, connecting conductors 41 and terminal electrodes 51 are formed on outer surfaces of the varistor element body 11 (step S113). Here, an electroconductive paste is printed by a screen printing process so as to come into contact with its corresponding first inner electrodes 23 on the first main face 13 of the varistor element body 11 and then dried, whereby conductor parts corresponding to the connecting conductors 41 are formed. Also, an electroconductive paste is printed on the second main face 15 of the varistor element body 11 by a screen printing process so as to come into contact with its corresponding second inner electrodes 33 on the second main face 15 of the varistor element body 11 and then dried, whereby electrode portions corresponding to the terminal electrodes 51 are formed. Thus formed electrode portions (electroconductive pastes) are baked at 500 to 850° C., so as to yield the varistor element body 11 formed with the connecting conductors 41 and terminal electrodes 51. For the electroconductive paste for the connecting conductors 41 and terminal electrodes 51, one in which glass frit, an organic binder, and an organic solvent are mixed with a metal powder mainly composed of Pt particles can be used as mentioned above. The glass frit used in the electroconductive paste for the connecting conductors 41 and terminal electrodes 51 contains at least one species of B, Bi, Al, Si, Sr, Ba, Pr, Zn, and the like.

Through the above-mentioned process, the multilayer chip varistor 1 is obtained. After the firing, an alkali metal (e.g., Li or Na) may be dispersed from the surface of the varistor element body 11. Known methods can be used for forming the solder bumps 53, which will not be explained here.

For forming the sheet multilayer body, the method of manufacturing an integrated substrate described in the specification of Japanese Patent Application No. 2005-201963 filed by the assignee may be used. This can provide the electroconductive paste for the connecting conductors 41 and terminal electrodes 51 without dividing the sheet multilayer body (integrated substrate) into a plurality of green bodies LS2 before firing it.

Since a plurality of terminal electrodes 51 are arranged on the second main face 15 of the varistor element body 11 in the first embodiment as in the foregoing, the multilayer chip varistor 1 can be mounted while in a state where the second main face 15 opposes a mounting component (e.g., electronic component or mounting substrate), whereby a structure corresponding to the BGA package is realized. Since each connecting conductor 41 is arranged on the first main face 15 so as to electrically connect the first inner electrodes 23 included in two inner electrode pairs positioned in a row in the laminating direction to each other, a region functioning as the varistor B exists at a position corresponding to the connecting conductor 41. Therefore, the connecting conductors 41 function as a mark for identifying the mounting direction of the multilayer chip varistor 1, whereby the multilayer chip varistor 1 can be mounted appropriately and easily.

This is particularly effective when the varistor element body 11 has a square form when seen in a direction perpendicular to the first and second main faces 13, 15, since the mounting direction of the multilayer chip varistor 1 is hard to identify according to the outer form of the varistor element body 11.

The first embodiment has no need to provide the varistor element body 11 with a mark for identifying the mounting direction of the multilayer chip varistor 1, and thus does not increase the manufacturing cost of the multilayer chip varistor 1.

Further, in the first embodiment, the varistor element body 11 contains Pr and Ca, while the electroconductive paste for the connecting conductors 41 and terminal electrodes 51 contains Pt. The connecting conductors 41 and terminal electrodes 51 are formed by applying the electroconductive paste for the connecting conductors 41 and terminal electrodes 51 onto the varistor element body 11 and baking them. These can improve the bonding strength between the varistor element body 11 and the connecting conductors 41 and terminal electrodes 51.

The effect of improving the bonding strength between the varistor element body 11 and the connecting conductors 41 and terminal electrodes 51 seems to result from the following phenomenon at the time of baking the electroconductive paste. When baking the electroconductive paste onto the varistor element body 11, Pr and Ca contained in the varistor element body 11 migrate to the vicinity of the surface of the varistor element body 11, i.e., the vicinity of the interface between the varistor element body 11 and electroconductive paste. Then, Pr and Ca migrated to the vicinity of the interface between the varistor element body 11 and electroconductive paste and Pt contained in the electroconductive paste diffuse into each other. When Pr and Ca and Pt diffuse into each other, a compound of Pr and Pt and a compound of Ca and Pt may be formed in the vicinity of the interface (including the interface) between the varistor element body 11 and the connecting conductors 41 and terminal electrodes 51. These compounds cause an anchor effect, thereby improving the bonding strength between the varistor element body 11 and the connecting conductors 41 and terminal electrodes 51.

The terminal electrodes 51 containing Pt are suitable mainly when mounting the multilayer chip varistor 1 to an external substrate or the like by solder reflow, and can improve solder leach resistance and solderability.

The structure of the multilayer chip varistor in accordance with a modified example of the first embodiment will now be explained with reference to FIGS. 9 to 12.

Figure 9:
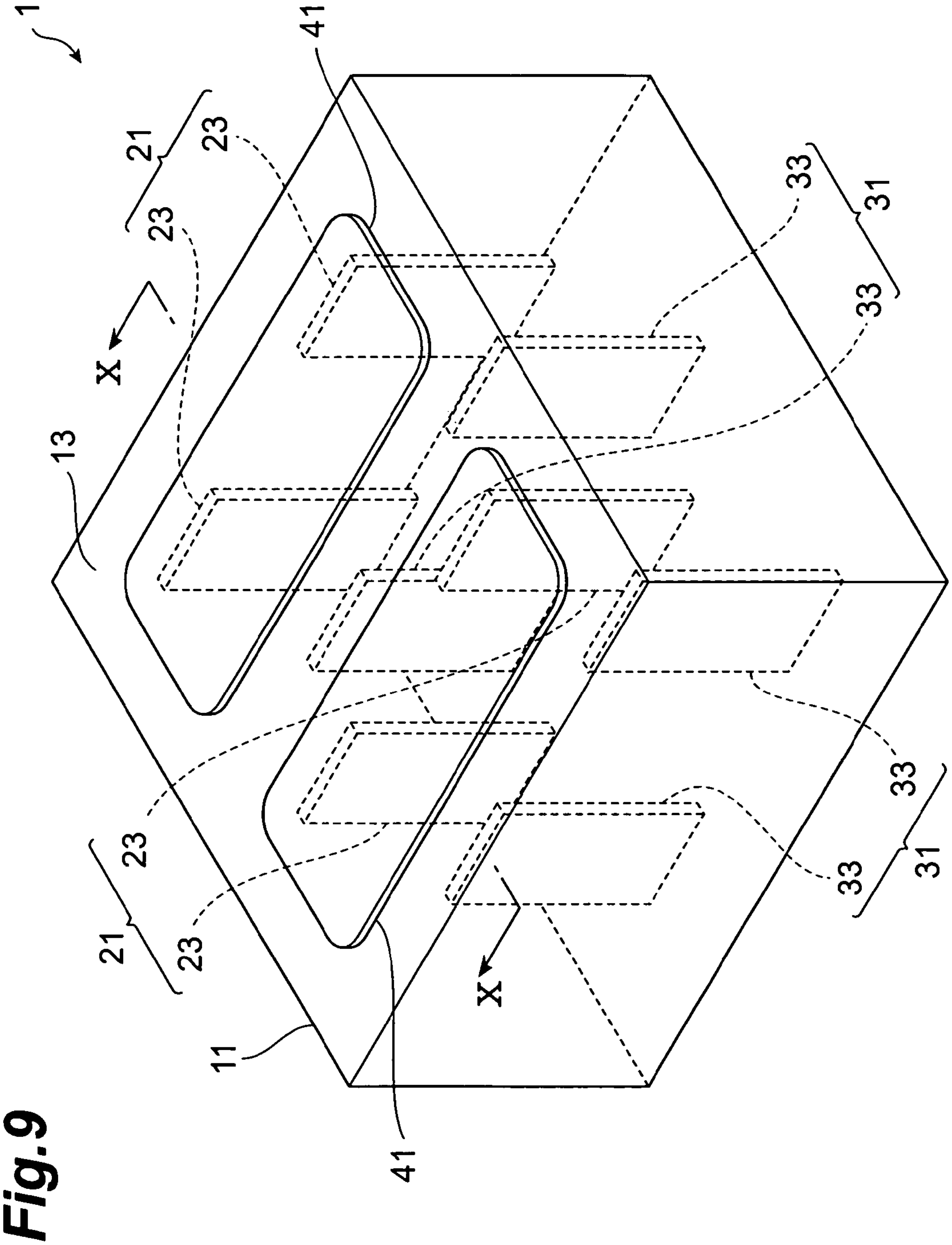
FIG. 9 is a perspective view showing a modified example of the multilayer chip varistor in accordance with the first embodiment.
Figure 10:
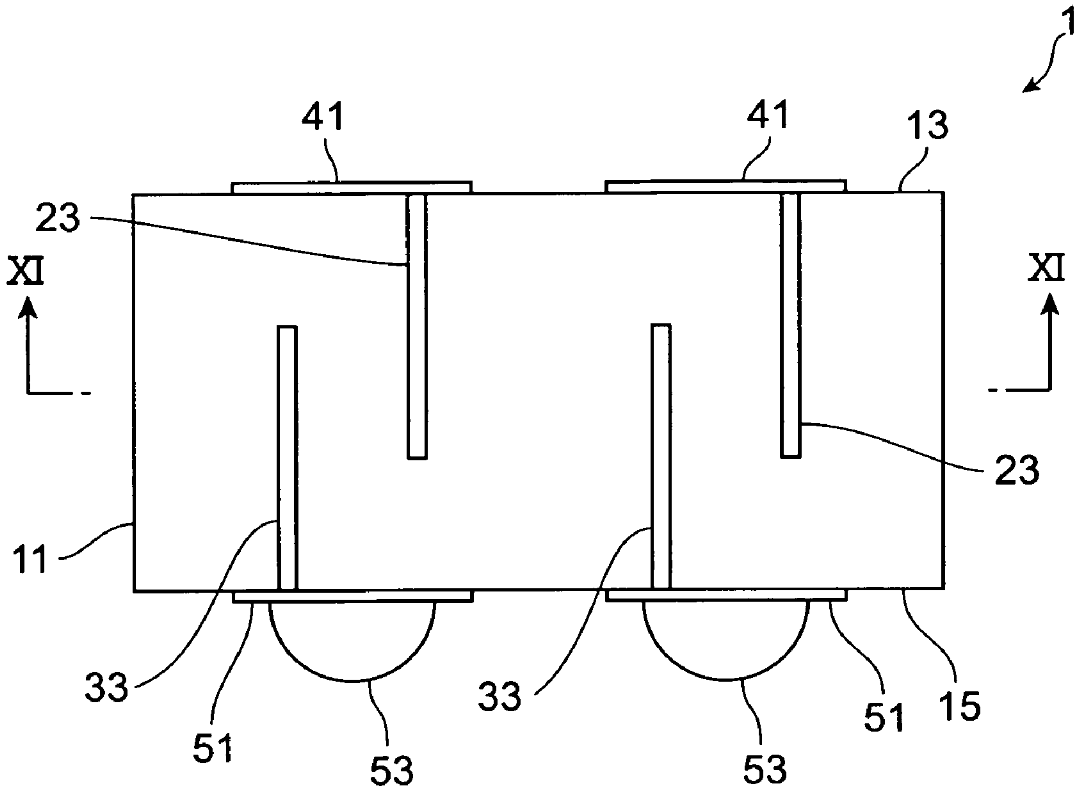
FIG. 10 is a view explaining a cross-sectional structure taken along the line X-X of FIG. 9.
Figure 11:
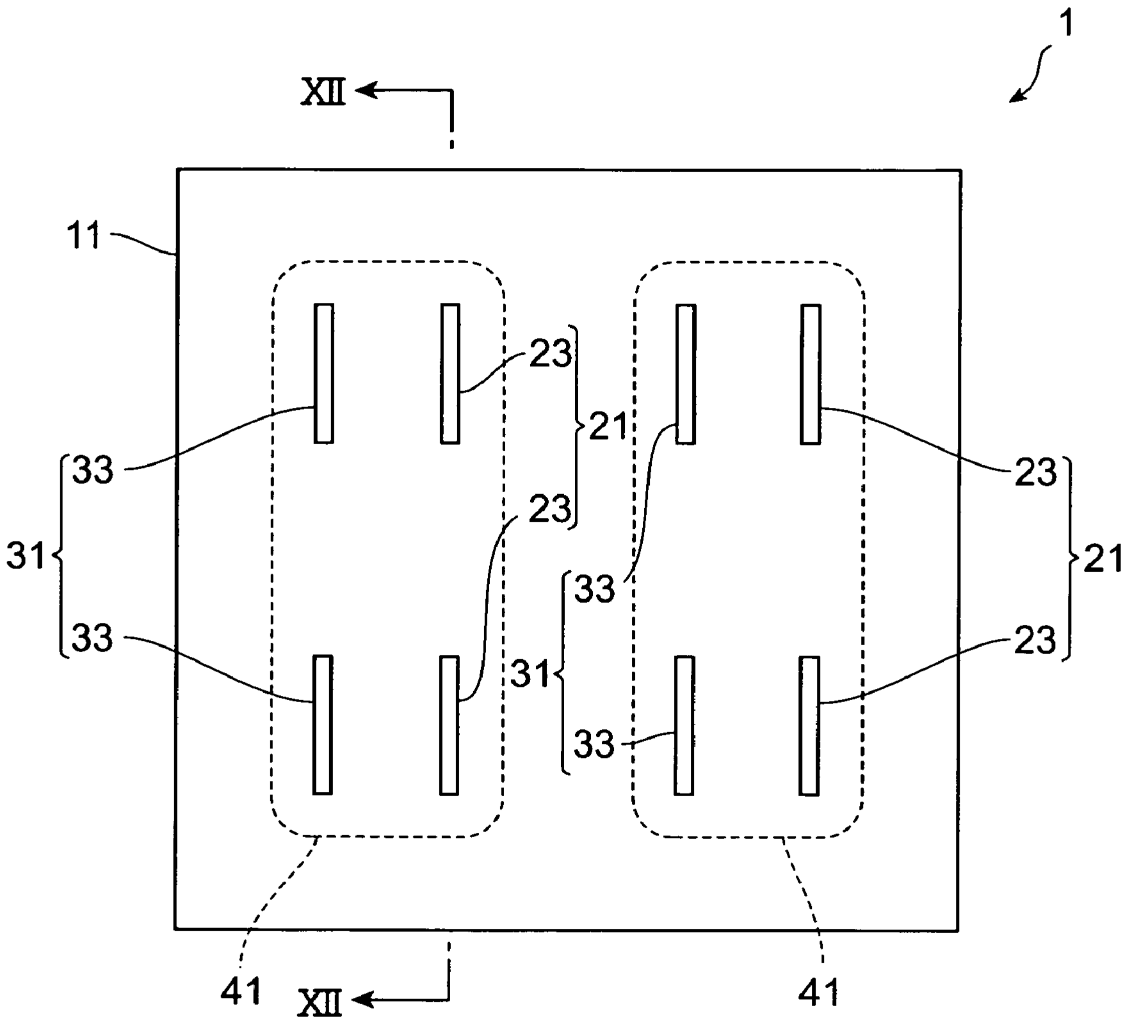
FIG. 11 is a view explaining a cross-sectional structure taken along the line XI-XI of FIG. 10.
Figure 12:
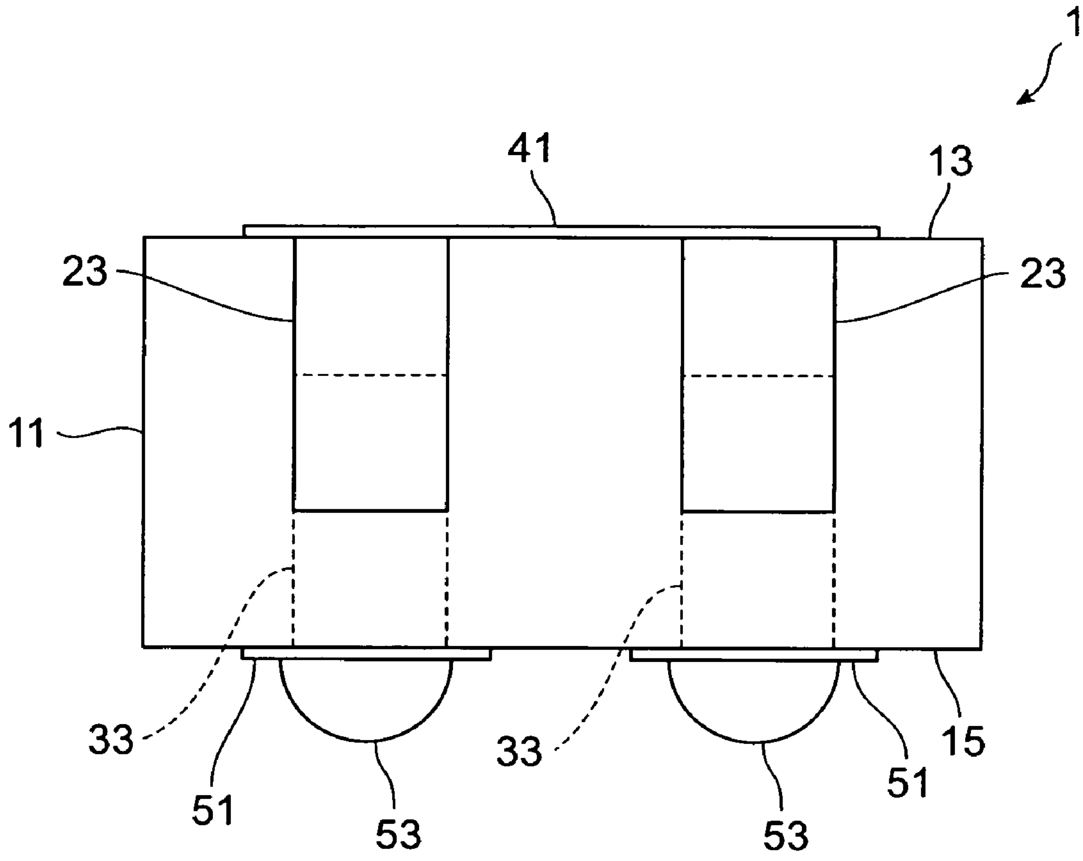
FIG. 12 is a view explaining a cross-sectional structure taken along the line XII-XII of FIG. 11.

FIG. 9 is a perspective view showing a modified example of the multilayer chip varistor in accordance with the first embodiment. FIG. 10 is a view explaining a cross-sectional structure taken along the line X-X of FIG. 9. FIG. 11 is a view explaining a cross-sectional structure taken along the line XI-XI of FIG. 10. FIG. 12 is a view explaining a cross-sectional structure taken along the line XII-XII of FIG. 11.

In the multilayer chip varistor 1 in accordance with the modified example, as shown in FIGS. 9 to 12, each connecting conductor 41 is arranged on the first main face 13 so as to cover the portions led to the first main face 13 in the respective first inner electrodes 23 included in two inner electrode pairs positioned in a row in a direction perpendicular to the laminating direction (i.e., parallel to the varistor layers) among four inner electrode pairs.

Figure 13:
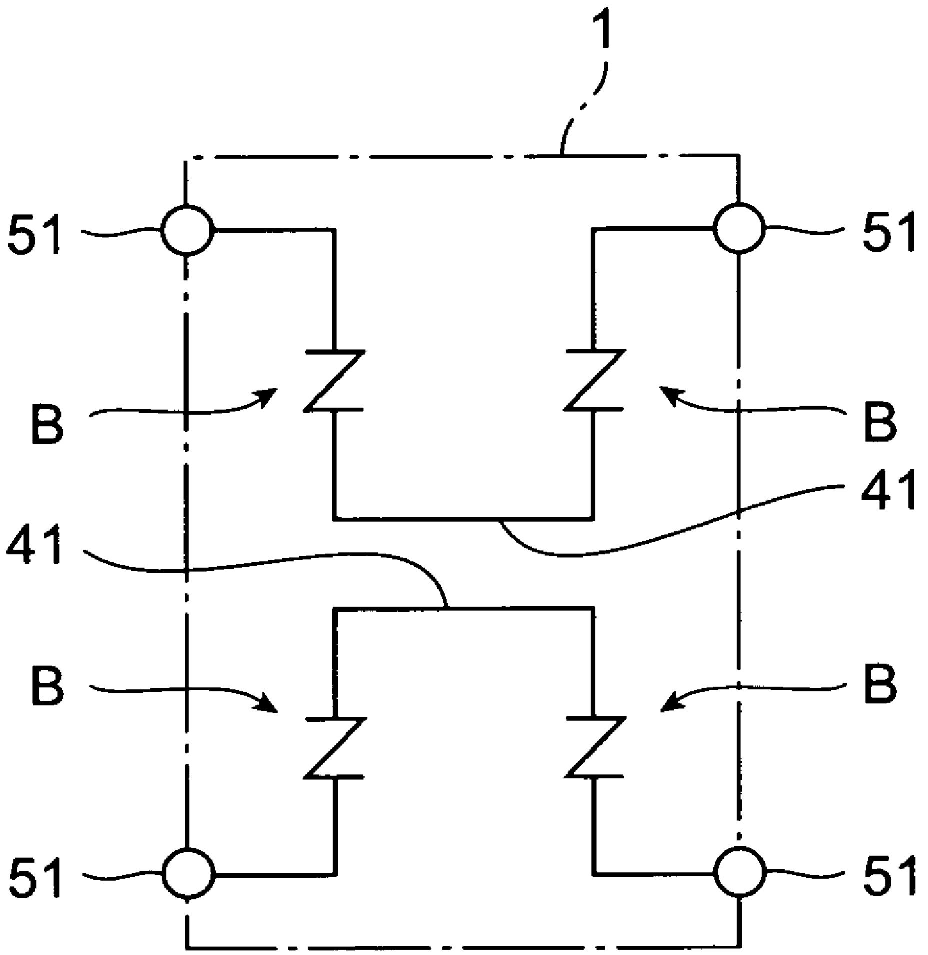
FIG. 13 is a diagram for explaining an equivalent circuit of the modified example of the multilayer chip varistor in accordance with the first embodiment.

The longer-side direction of each connecting conductor 41 is substantially perpendicular to the laminating direction. Namely, the connecting conductor 41 is formed so as to extend in a direction perpendicular to the laminating direction. As shown in FIG. 13, one terminal electrode 51 and the other terminal electrode 51 in two varistors B connected in series are arranged in a row in a direction perpendicular to the laminating direction. Therefore, two varistors B connected in series exist between a pair of terminal electrodes 51 arranged in a row in the longer-side direction of the connecting conductor 41.

In the first embodiment, the number of inner electrode pairs is not limited to 4, for example. The number of inner electrode pairs may be 2 or 4 or more, but is preferably an even number.

Though one connecting conductor 41 is provided for two inner electrode pairs in the above-mentioned first embodiment, it is not restrictive. For example, one connecting conductor 41 may be provided for three inner electrode pairs. In this case, the connecting conductor 41 electrically connects the respective first inner electrodes 23 included in three inner electrode pairs positioned in a row in the laminating direction or a direction perpendicular to the laminating direction to each other.

Though each varistor B has a structure in which one first inner electrode 23 and one second inner electrode 33 hold a varistor layer therebetween in the above-mentioned multilayer chip varistor 1, it is not restrictive. Each varistor B may have a structure in which a plurality of first inner electrodes 23 and a plurality of second inner electrodes 33 hold varistor layers therebetween.

Second Embodiment

Structure of Multilayer Chip Varistor

Figure 14:
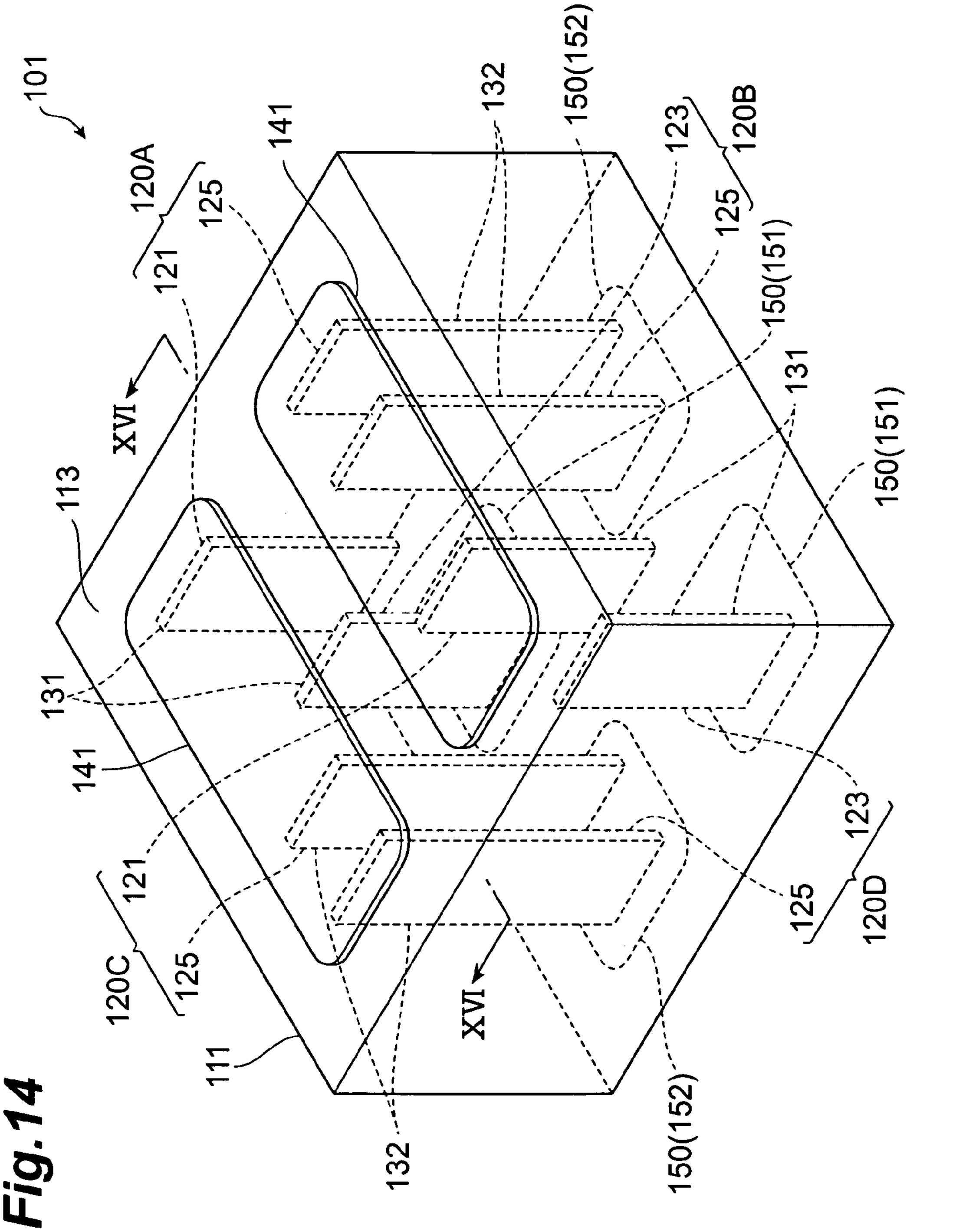
FIG. 14 is a perspective view of the multilayer chip varistor in accordance with a second embodiment seen from the connecting conductor side.
Figure 15:
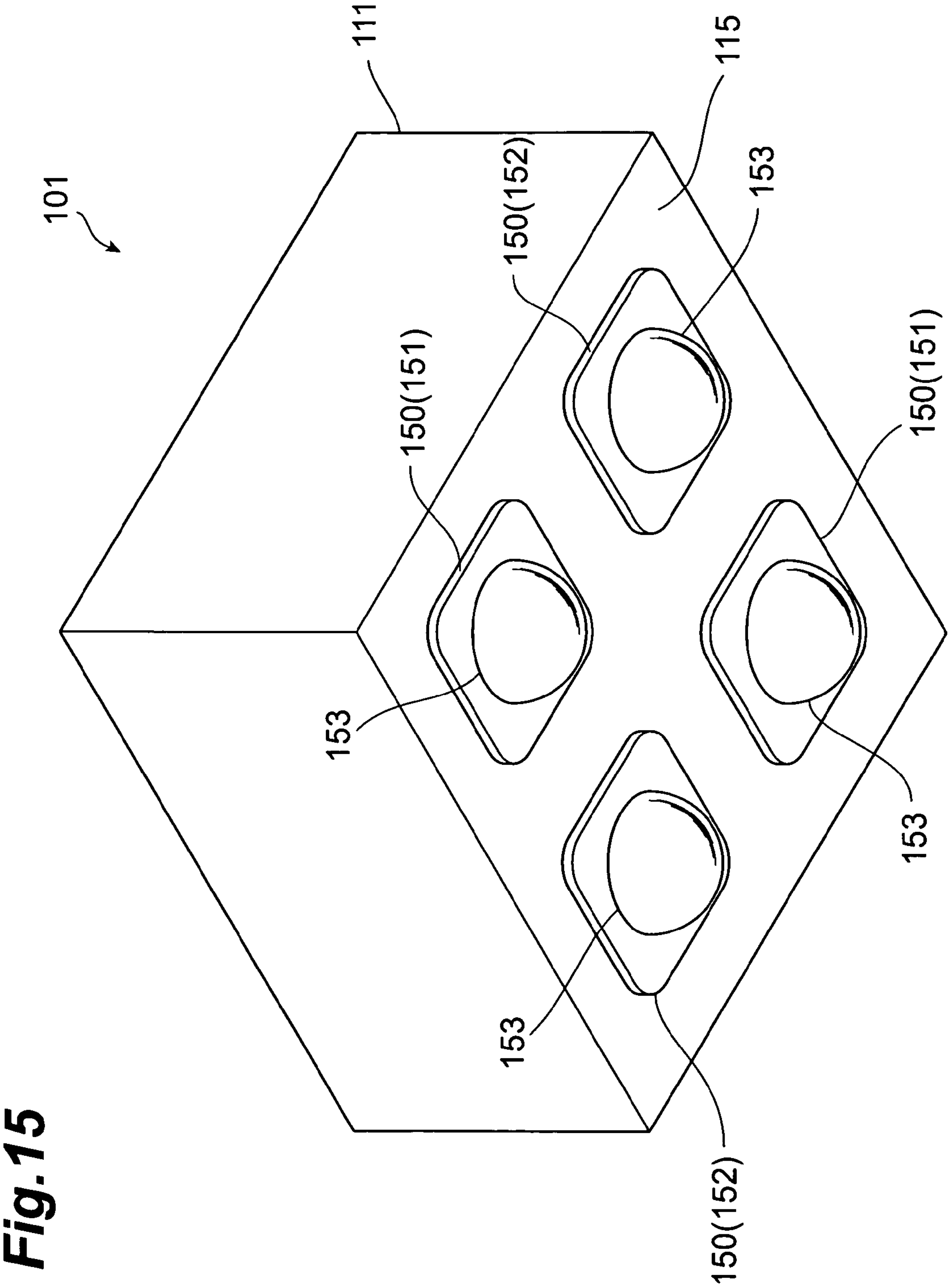
FIG. 15 is a perspective view of the multilayer chip varistor in accordance with the second embodiment seen from the terminal electrode side.
Figure 16:
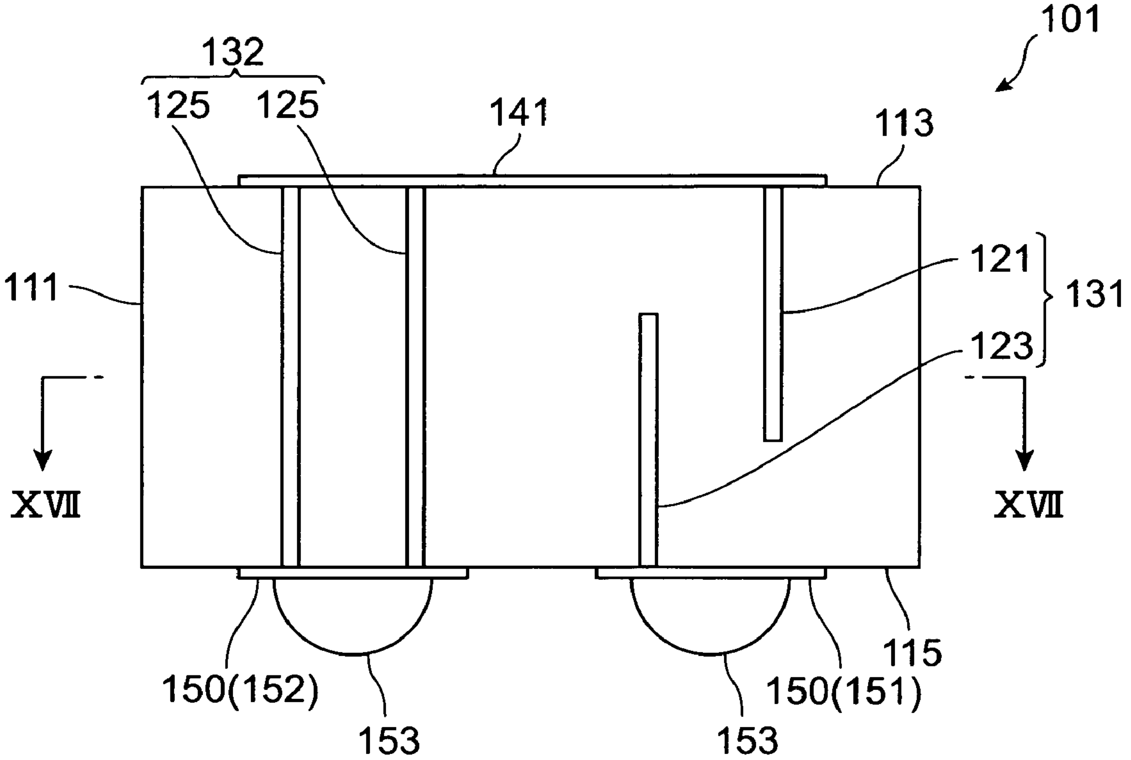
FIG. 16 is a sectional view taken along the line XVI-XVI of FIG. 14.
Figure 17:
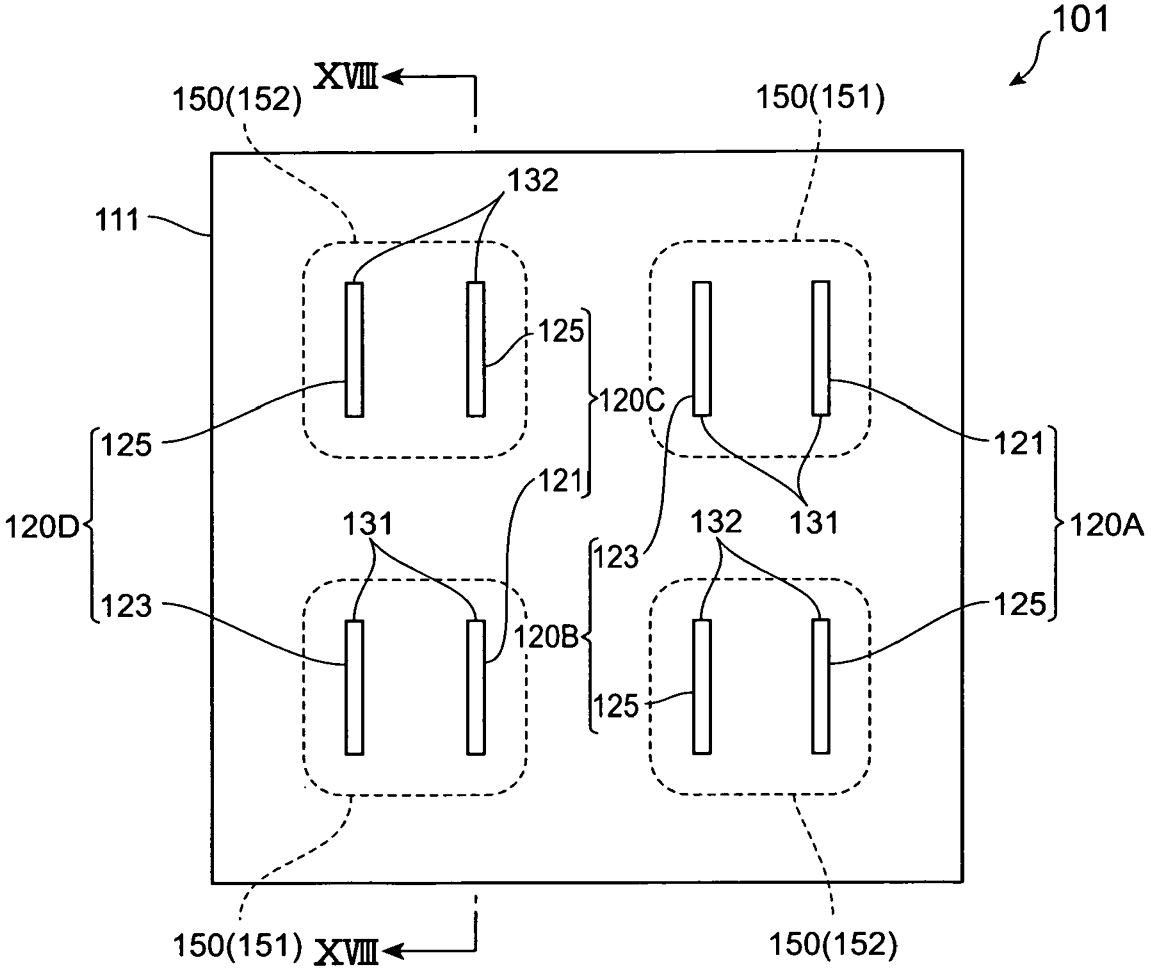
FIG. 17 is a sectional view taken along the line XVII-XVII of FIG. 16.
Figure 18:
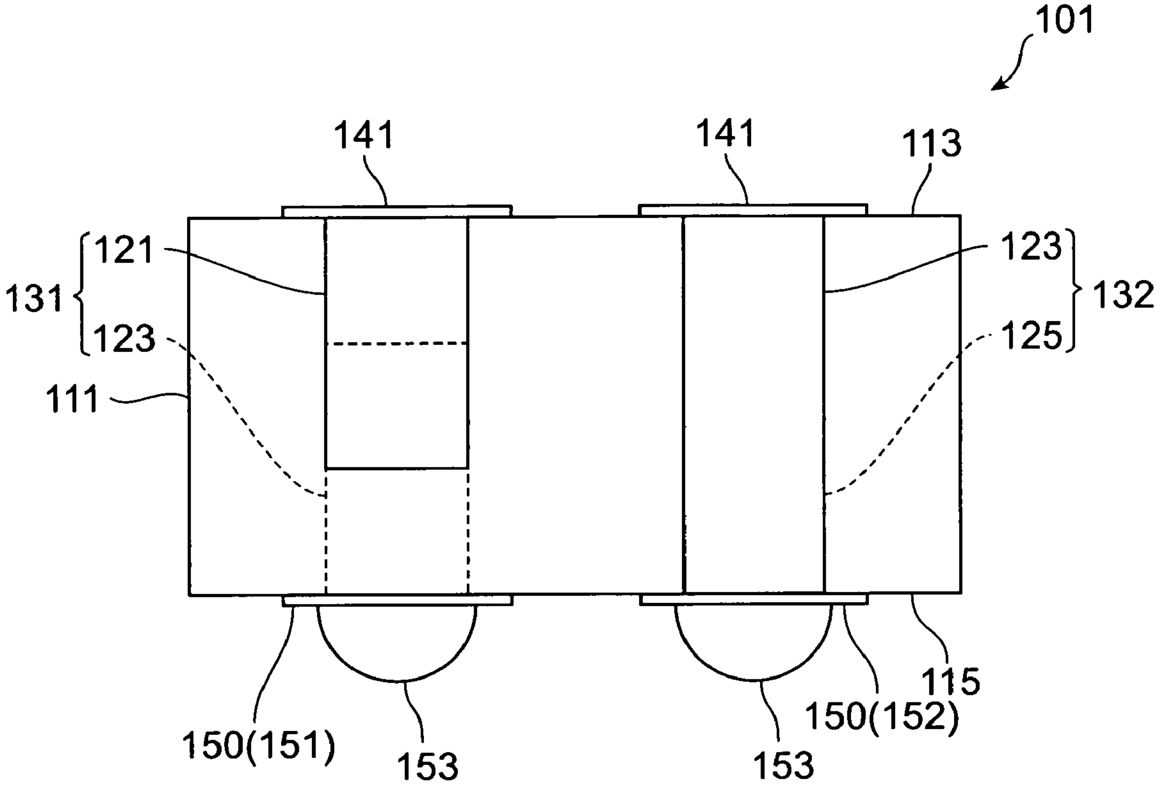
FIG. 18 is a sectional view taken along the line XVIII-XVIII of FIG. 17.

The structure of a multilayer chip varistor 101 in accordance with a second embodiment will be explained with reference to FIGS. 14 to 19. FIG. 14 is a perspective view of the multilayer chip varistor in accordance with the second embodiment seen from the connecting conductor side. FIG. 14 is a perspective view of the multilayer chip varistor in accordance with the second embodiment seen from the connecting conductor side. FIG. 15 is a perspective view of the multilayer chip varistor in accordance with the second embodiment seen from the terminal electrode side. FIG. 16 is a sectional view taken along the line XVI-XVI of FIG. 14. FIG. 17 is a sectional view taken along the line XVII-XVII of FIG. 16. FIG. 18 is a sectional view taken along the line XVIII-XVIII of FIG. 17.

As shown in FIGS. 14 to 18, the multilayer chip varistor 101 comprises a varistor element body 111, a plurality of (2 in the second embodiment) connecting conductors 141, and a plurality of (4 in the second embodiment) terminal electrodes 150.

The varistor element body 111 is a planar body whose longitudinal cross section is substantially rectangular. The varistor element body 111 has a first main face 113 and a second main face 115 which oppose each other. In the second embodiment, both of the first main face 113 and second main face 115 are square. Namely, the varistor element body 111 has a square form when seen in a direction perpendicular to the first main face 113 and second main face 115. The length, width, and thickness of the varistor element body 111 can be set to about 1 mm, about 1 mm, and about 0.5 mm, respectively, for example.

The varistor element body 111 is constructed as a multilayer body in which a plurality of varistor layers exhibiting a nonlinear voltage-current characteristic (hereinafter referred to as "varistor characteristic") are laminated. In the actual multilayer chip varistor 101, the plurality of varistor layers are integrated to such an extent that their boundaries are indiscernible. The varistor layers contain ZnO (zinc oxide) as a principal component and contain as accessory components single metals, such as rare-earth metals, Co, IIIb elements (B, Al, Ga, In), Si, Cr, Mo, alkali metal elements (K, Rb, Cs), and alkaline earth metals (Mg, Ca, Sr, Ba), or oxides of them. In the second embodiment, the varistor layers contain Pr, Co, Cr, Ca, Si, K, Al, and the like as accessory components.

In the first embodiment, Pr is used as a rare-earth metal. Pr becomes a material for exhibiting a varistor characteristic. Pr is used because of its excellent voltage-current nonlinearity and its small variations in characteristics at the time of mass-production.

In the first embodiment, Ca is used as an alkaline-earth metal element. Ca becomes a material for regulating the sintering property of the ZnO-based varistor material and improving the resistance to humidity. Ca is used for improving the voltage-current nonlinearity.

The ZnO content in the varistor layers is not restricted in particular, but is typically 99.8 to 69.0 mass % when the material constituting the varistor layers is 100 mass % in total. The thickness of each varistor layer may be about 5 to 60 μm, for example.

In the varistor element body 111, a plurality of (4 in the second embodiment) conductor layers 120A to 120D are arranged. The conductor layers 120A and 120B are arranged such that at least one varistor layer is interposed therebetween. The conductor layers 120C and 120D are arranged such that at least one varistor layer is interposed therebetween.

As shown in FIGS. 16 to 18, each of the conductor layers 120A and 120C includes one each of first inner electrode 121 and inner conductor 125. In each of the conductor layers 120A and 120C, the first inner electrode 121 and the inner conductor 125 are positioned with a predetermined gap therebetween so as to be electrically insulated from each other while each being separated by a predetermined distance from a side face parallel to the laminating direction of the varistor layers (hereinafter simply referred to as "laminating direction").

As shown in FIGS. 16 to 18, each of the conductor layers 120B and 120D includes one each of second inner electrode 123 and inner conductor 125. In each of the conductor layers 120B and 120D, the second inner electrode 123 and the inner conductor 125 are positioned with a predetermined gap therebetween so as to be electrically insulated from each other while each being separated by a predetermined distance from a side face parallel to the laminating direction.

The first inner electrode 121 of the conductor layer 120A, the second inner electrode 123 of the conductor layer 120B, and the respective inner conductors 125 of the conductor layers 120C, 120D are arranged on the varistor layers so as to overlap each other when seen in the laminating direction. The respective inner conductors 125 of the conductor layers 120A, 120B, the first inner electrode 121 of the conductor layer 120C, and the second inner electrode 123 of the conductor layer 120D are arranged on the varistor layers so as to overlap each other when seen in the laminating direction. Therefore, inner electrode pairs 131 and 132, which will be explained later, are positioned in a row in the laminating direction and in a row in a direction substantially perpendicular to the laminating direction.

Each first inner electrode 121 has a substantially rectangular form. Each first inner electrode 121 is led to the first main face 113 so as to have one end reaching the first main face 113. At least a portion of the first inner electrode 121 in the conductor layer 120A opposes the second inner electrode 123 in the conductor layer 120B with a varistor layer interposed therebetween. At least a portion of the first inner electrode 121 in the conductor layer 120C opposes the second inner electrode 123 in the conductor layer 120D with a varistor layer interposed therebetween.

Each second inner electrode 123 has a substantially rectangular form. Each second inner electrode 123 is led to the second main face 115 so as to have one end reaching the second main face 115. At least a portion of the second inner electrode 123 in the conductor layer 120B opposes the first inner electrode 121 in the conductor layer 120A with a varistor layer interposed therebetween. At least a portion of the second inner electrode 123 in the conductor layer 120D opposes the first inner electrode 121 in the conductor layer 120C with a varistor layer interposed therebetween.

As mentioned above, the first inner electrode 121 and second inner electrode 123 are arranged so as to oppose each other at least partly within the varistor element body 111. Consequently, the multilayer chip varistor 101 is equipped with a plurality of (2 in this embodiment) inner electrode pairs 131 including the first and second inner electrodes 121, 123 arranged so as to oppose each other at least partly within the varistor element body 111. Therefore, a region where the first inner electrode 121 and second inner electrode 123 overlap each other in each varistor layer functions as an area exhibiting a varistor characteristic.

Each inner conductor 125 has a substantially rectangular form. Each inner conductor 125 is led to the first main face 113 so as to have one end reaching the first main face 113, and is led to the second main face 115 so as to have the other end reaching the second main face 115. In the second embodiment, the conductor layers 120A, 120B are arranged such that their respective inner conductors 125 oppose each other within the varistor element body 111. The conductor layers 120C, 120D are arranged such that their respective inner conductors 125 oppose each other within the varistor element body 111. Consequently, the multilayer chip varistor 101 is equipped with a plurality of (2 in the second embodiment) pairs of inner conductors 125 (inner conductor pairs 132) arranged within the varistor element body 111.

The first and second inner electrodes 121, 123 and inner conductors 125 contain an electroconductive material. The electroconductive material contained in the first and second inner electrodes 121, 123 and inner conductors 125 is not limited in particular, but preferably is made of Pd or an Ag—Pd alloy. Each of the first and second inner electrodes 121, 123 and inner conductors 125 may have a thickness of about 0.5 to 5 μm, for example.

Here, the first main face 113 and second main face 115 expand in a direction extending along (parallel to in the second embodiment) the laminating direction and intersecting (orthogonal to in the second embodiment) the first and second inner electrodes 121, 123 and inner conductors 125. The laminating direction is a direction parallel to the opposing direction of the first and second inner electrodes 121, 123 (opposing direction of the inner conductors 125) and orthogonal to the first and second inner electrodes 121, 123 and inner conductors 125.

As also shown in FIGS. 16 and 18, each connecting conductor 141 is arranged on the first main face 113 so as to cover the respective portions led to the first main face 113 in the first inner electrode 121 included in the inner electrode pair 131 and the inner conductors 125 included in the inner conductor pair 132 in the inner electrode pair 131 and inner conductor pair 132 arranged in a row in the laminating direction within the varistor element body 111. The portions of the first inner electrodes 121 and inner conductors 125 led to the first main face 113 are connected to their corresponding conductors 141 physically and electrically. Consequently, each connecting conductor 141 electrically connects the first inner electrode 121 and inner conductors 125 positioned in a row in the laminating direction to each other.

Each connecting conductor 141 has a substantially rectangular form (substantially oblong form in the second embodiment). The length of each longer side, length of each shorter side, and thickness of the connecting conductor 141 are set to about 0.8 mm, about 0.4 mm, and about 2 μm, respectively, for example. The connecting conductor 141 extends in a direction substantially parallel to the laminating direction.

The connecting conductors 141 contain Pt. The connecting conductors 141 are formed by baking an electroconductive paste as will be explained later. Employed as the electroconductive paste is one in which glass frit, an organic binder, and an organic solvent are mixed with a metal powder mainly composed of Pt particles.

As shown in FIGS. 15 and 17, the terminal electrodes 150 are arranged two-dimensionally in n rows by n columns (where parameter n is an even number of 2 or greater) on the second main face 115. In the second embodiment, the terminal electrodes 51 are two-dimensionally arranged in 2 rows by 2 columns. Each terminal electrode 150 has a substantially rectangular form (substantially square form in the second embodiment). The length of each side and thickness of the terminal electrode 150 are set to about 0.4 mm and about 2 μm, respectively, for example.

The terminal conductors 150 contain Pt. The terminal electrodes 150 are formed by baking an electroconductive paste as will be explained later. Employed as the electroconductive paste is one in which glass frit, an organic binder, and an organic solvent are mixed with a metal powder mainly composed of Pt particles. Solder bumps 153 are arranged at the respective terminal electrodes 150.

In the second embodiment, the terminal electrodes 150 comprise two first terminal electrodes 151 and two second terminal electrodes 152.

As also shown in FIGS. 16 and 18, the first terminal electrodes 151 are arranged on the second main face 115 so as to cover the portions led to the second main face 115 in their corresponding second inner electrodes 123. The portions of the second inner electrodes 123 led to the second main face 115 are connected to their corresponding first terminal electrodes 151 physically and electrically. Consequently, the first terminal electrodes 151 are electrically connected to their corresponding second inner electrodes 123.

As also shown in FIGS. 16 and 18, the second terminal electrodes 151 are arranged on the second main face 115 so as to cover the portions led to the second main face 115 in the inner conductors 125 included in their corresponding inner conductor pairs 132. The portions of the inner conductors 125 led to the second main face 115 are connected to their corresponding second terminal electrodes 152 physically and electrically. Consequently, the second terminal electrodes 152 are electrically connected to the inner conductors 125 included in their corresponding inner conductor pairs 132.

Here, as mentioned above, the inner electrode pairs 131 and 132 are positioned in a row in the laminating direction and in a row in a direction substantially perpendicular to the laminating direction within the varistor element body 111. Therefore, the first terminal electrodes 151 electrically connected to the second inner electrodes 123 included in the inner electrode pairs 131 and the second terminal electrodes 152 electrically connected to the inner conductors 125 included in the inner conductor pairs 132 are also arranged on the second main face 115 so as to be positioned in a row in the laminating direction and in a row in a direction substantially perpendicular to the laminating direction. Namely, the first and second terminal electrodes 151, 152 are arranged so as to alternate with each other in both of the column and row directions.

Figure 19:
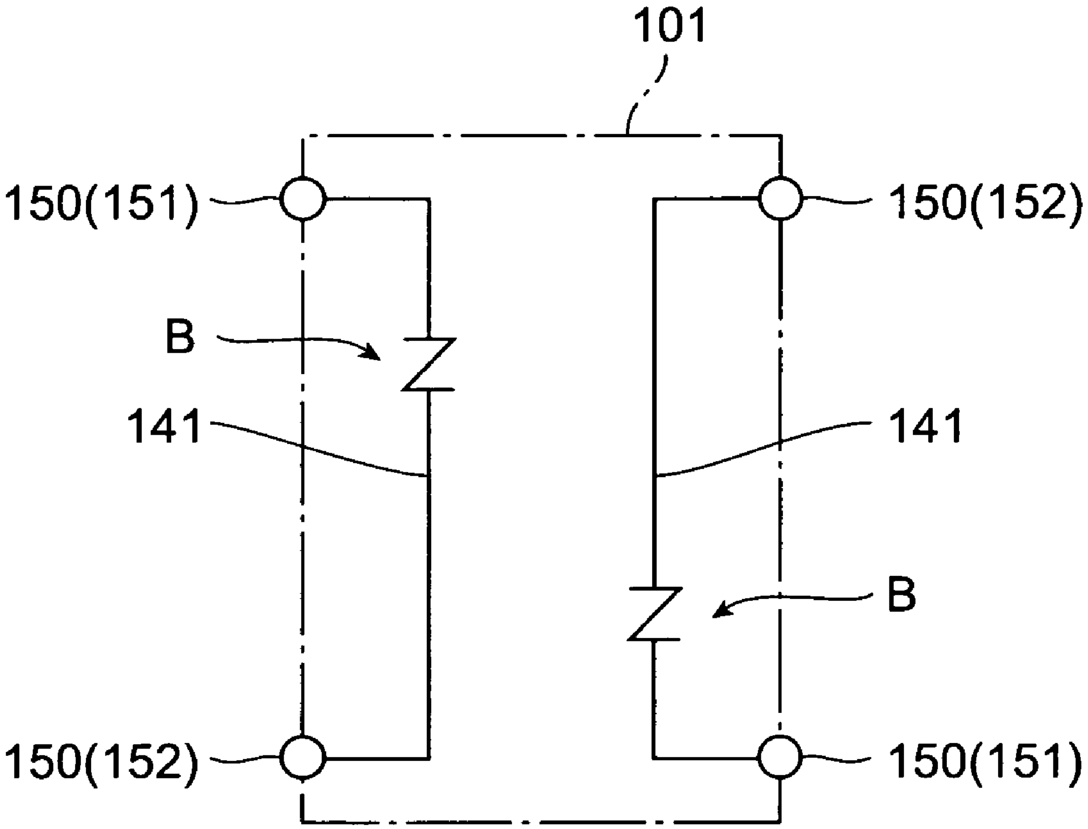
FIG. 19 is a view for explaining an equivalent circuit of the multilayer chip varistor in accordance with the second embodiment.

As shown in FIG. 19, the multilayer chip varistor 101 having the above-mentioned structure includes two sets of varistors B each connecting the first terminal electrode 151 and second terminal electrode 152 to each other. Each varistor B is constructed by the first inner electrode 121, the second inner electrode 123, and a region where the first and second inner electrodes 121, 123 overlap each other in the varistor layer. The connecting conductor 141 extends in a direction substantially parallel to the laminating direction. The first and second terminal electrodes 151, 152 electrically connected to the varistor B are arranged in a row in the laminating direction. As a consequence, each varistor B exists between a pair of the first and second terminal electrodes arranged in a row in the longer-side direction of the connecting conductor 141.

Multilayer Chip Varistor Manufacturing Process

Figure 20:
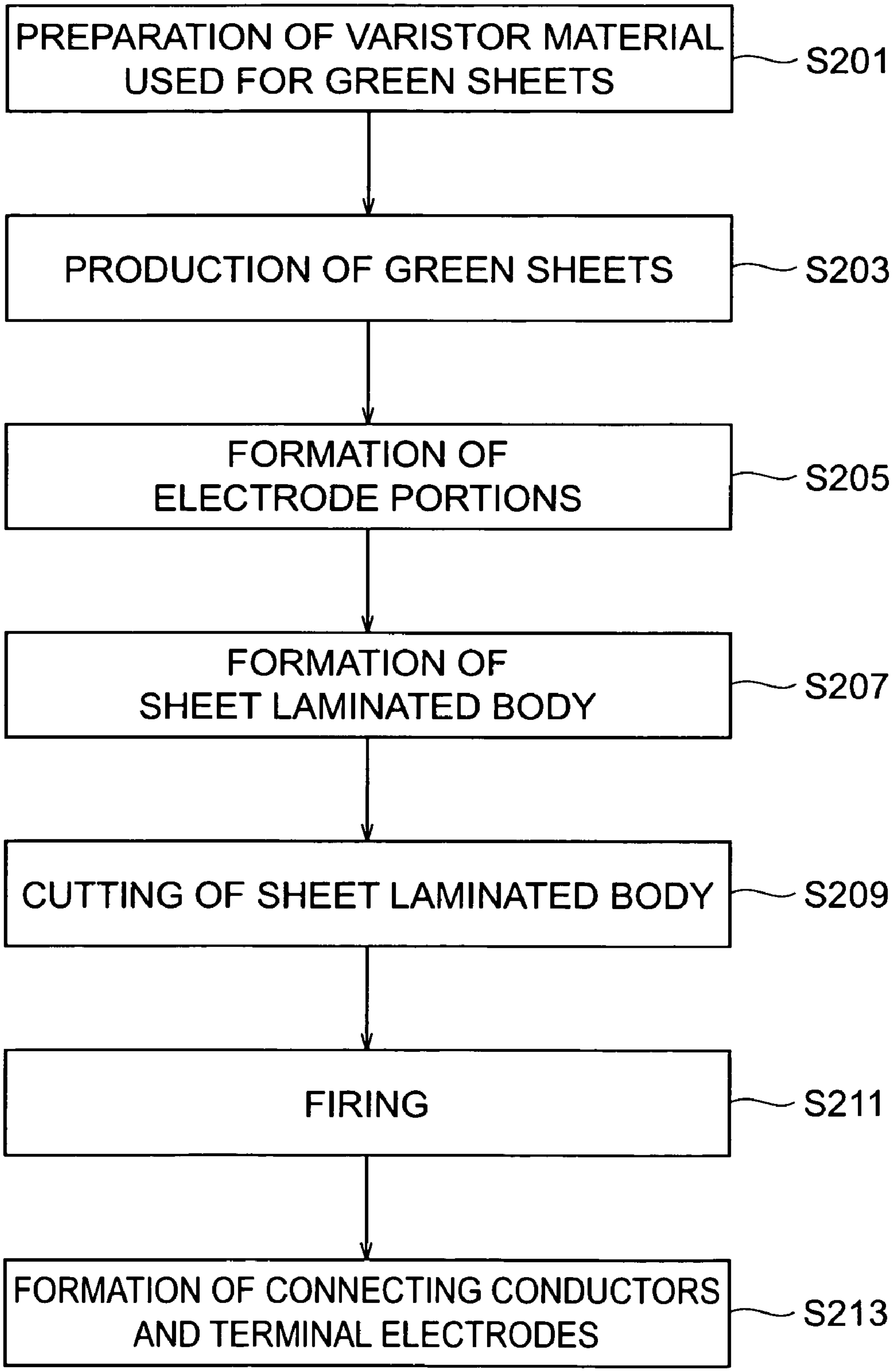
FIG. 20 is a flowchart for explaining a manufacturing process of the multilayer chip varistor in accordance with the second embodiment.
Figure 21:
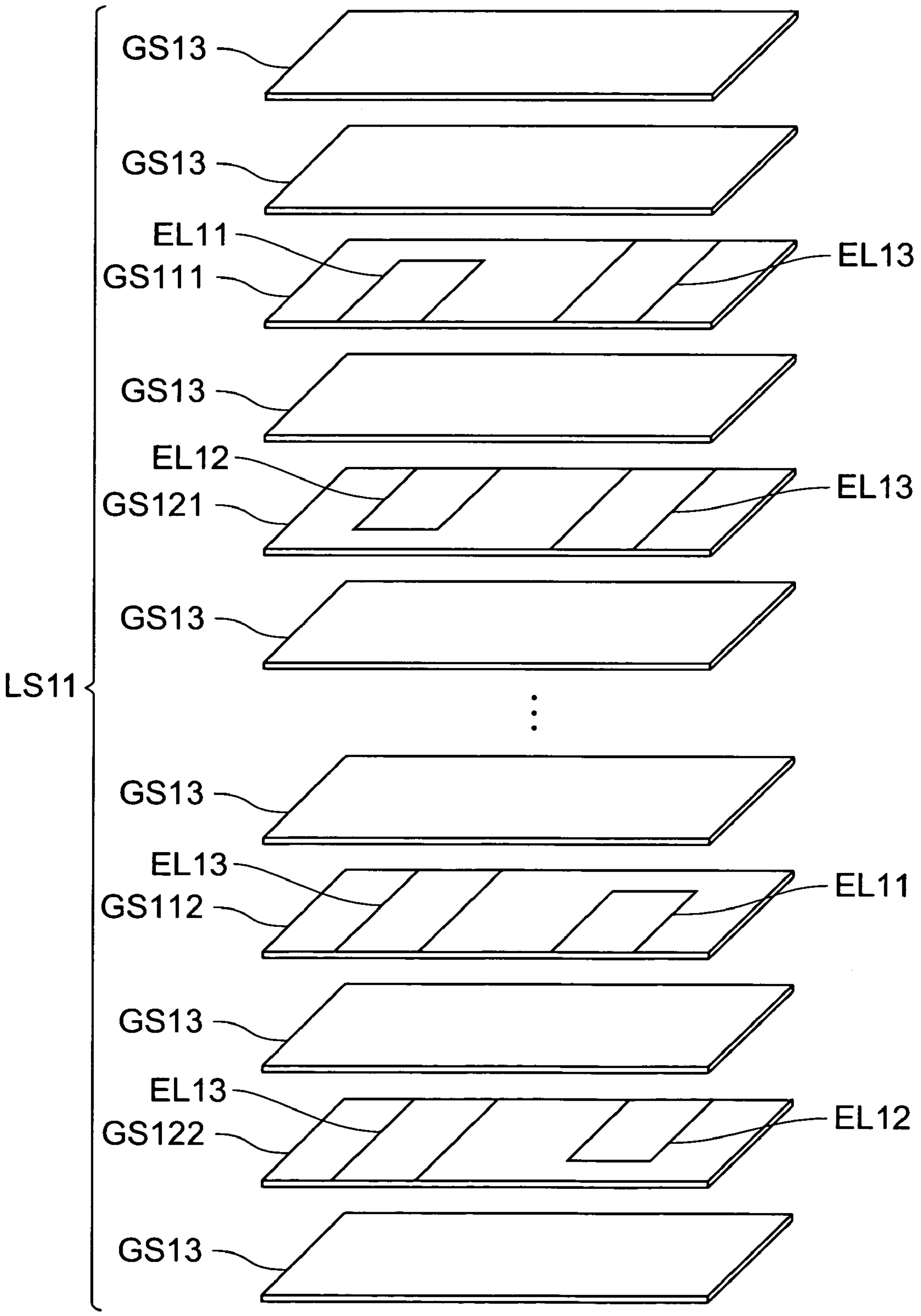
FIG. 21 is a view for explaining the manufacturing process of the multilayer chip varistor in accordance with the second embodiment.

A process of manufacturing the multilayer chip varistor having the above-mentioned structure will now be explained with reference to FIGS. 20 and 21. FIG. 20 is a flowchart for explaining the manufacturing process of the multilayer chip varistor in accordance with the second embodiment. FIG. 21 is a view for explaining the manufacturing process of the multilayer chip varistor in accordance with the second embodiment. In FIG. 20, "step" is abbreviated as S.

First, a varistor material is prepared by weighing each of ZnO as a principal component forming the varistor layers, and the additives of small amount, such as metals or oxides of Pr, Co, Cr, Ca, Si, K, and Al at a predetermined ratio and thereafter mixing them (step S201). Thereafter, an organic binder, an organic solvent, an organic plasticizer, and the like are added to the varistor material, and they are mixed and pulverized for about 20 hr by using a ball mill or the like, so as to yield a slurry.

The slurry is applied onto film, for example, of polyethylene terephthalate by a known method, such as the doctor blade method, and then dried to form membranes in the thickness of about 30 μm. The membranes obtained are peeled off from the polyethylene terephthalate film to obtain green sheets (step S203).

Next, a plurality of green sheets (by the number corresponding to the number of divided chips which will be explained later) formed with conductor portions corresponding to the first inner electrodes 121 and conductor portions corresponding to the inner conductors 125 are formed (step S205). Similarly, a plurality of green sheets (by the number corresponding to the number of divided chips which will be explained later) formed with conductor portions corresponding to the second inner electrodes 123 and conductor portions corresponding to the inner conductors 125 are formed (step S205). The conductor portions corresponding to the first and second inner electrodes 121, 123 and inner conductors 125 are formed by printing an electroconductive paste, in which a metal powder mainly composed of Pd particles, an organic binder, and an organic solvent are mixed, by a printing method such as screen printing and drying the printed paste.

Next, the green sheets formed with the conductor portions and green sheets formed with no conductor portions are laminated in a predetermined order, so as to form a sheet multilayer body (step S207). Thus obtained sheet multilayer body is cut into chips, for example, so as to yield a plurality of divided green bodies LS11 (see FIG. 21) (step S209). In thus obtained green body LS11, green sheets GS111, 112 formed with conductor portions EL11 corresponding to the first inner electrodes 121 and conductor portions EL13 corresponding to the inner conductors 125, green sheets GS121, 122 formed with conductor portions EL12 corresponding to the second inner electrodes 123 and conductor portions EL13 corresponding to the inner conductors 125, and green sheets GS13 formed with no conductor portions EL11 to EL13 are laminated in a predetermined order. A plurality of green sheets GS13 formed with no conductor portions EL11 to EL13 may be laminated at each place if necessary.

The conductor portion EL11 formed on the green sheet GS111, the conductor portion EL12 formed on the green sheet GS121, and the conductor portions EL13 formed on the green sheets GS112, 122 are arranged so as to overlap each other when seen in the laminating direction of green sheets. Similarly, the conductor portions EL13 formed on the green sheets GS111, GS121, the conductor portion EL11 formed on the green sheet GS112, and the conductor portion EL12 formed on the green sheet GS122 are arranged so as to overlap each other when seen in the laminating direction of green sheets.

Next, the green body LS11 is debindered by heat treatment at about 180 to 400° C. for about 0.5 to 24 hr, and then fired at about 850 to 1400° C. for about 0.5 to 8 hr (step S211), so as to yield a varistor element body 111. This firing turns the green sheets GS111, GS112, GS121, GS122, and GS13 in the green body LS11 into varistor layers, whereby the conductor portions EL11, EL12, and EL13 become the inner electrodes 121, 123 and inner conductor 125, respectively.

Next, connecting conductors 141 and terminal electrodes 150 (first and second terminal electrodes 151, 152) are formed on outer surfaces of the varistor element body 111 (step S213). Here, an electroconductive paste is printed by a screen printing process so as to come into contact with its corresponding first inner electrodes 121 on the first main face 113 of the varistor element body 111 and then dried, whereby conductor portions corresponding to the connecting conductors 141 are formed. Also, an electroconductive paste is printed on the second main face 115 of the varistor element body 111 by a screen printing process so as to come into contact with the second inner electrode 123 included in its corresponding inner electrode pair 131 and then dried, whereby the first terminal electrode 151 is formed. Further, an electroconductive paste is printed on the second main face 115 of the varistor element body 111 by a screen printing process so as to come into contact with the inner conductors 125 included in its corresponding inner electrode pair 132 and then dried, whereby the second terminal electrode 152 is formed.

Thus formed conductor portions (electroconductive pastes) are baked at 500 to 850° C., so as to yield the varistor element body 111 formed with the connecting conductors 141 and terminal electrodes 150 (first and second terminal electrodes 151, 152). For the electroconductive paste for the conductors 141 and terminal electrodes 150 (first and second terminal electrodes 151, 152), one in which glass frit, an organic binder, and an organic solvent are mixed with a metal powder mainly composed of Pt particles can be used as with the above-mentioned electroconductive paste for forming the first and second inner electrodes 121, 123 and inner conductors 125. Preferably, the glass frit used in the electroconductive paste for forming the connecting conductors 141 and terminal electrodes 150 (first and second terminal electrodes 151, 152) contains at least one species of B, Bi, Al, Si, Sr, Ba, Pr, Zn, and the like.

Through the above-mentioned process, the multilayer chip varistor 101 is obtained. After the firing, an alkali metal (e.g., Li or Na) may be dispersed from the surface of the varistor element body 111. Known methods can be used for forming the solder bumps 153.

For forming the sheet multilayer body, the method of manufacturing an integrated substrate described in the specification of Japanese Patent Application No. 2005-201963 filed by the assignee may be used. This can provide the electroconductive paste for the connecting conductors 141 and terminal electrodes 150 (first and second terminal electrodes 151, 52) without dividing the sheet multilayer body (integrated substrate) into a plurality of green bodies LS11 before firing it.

In the second embodiment, as in the foregoing, a plurality of first and second terminal electrodes 151, 52 are arranged on the second main face 115. Therefore, the multilayer chip varistor 101 can be mounted while in a state where the second main face 115 opposes a mounting component (e.g., electronic component or mounting substrate), whereby a structure corresponding to the BGA package is realized. Also, in the second embodiment, each connecting conductor 141 is arranged on the first main face 113 so as to electrically connect the first inner electrode 121 included in the inner electrode pair 131 and the inner conductors 125 included in the inner electrode pair 132 in the inner electrode pairs 131, 132 arranged in a row in the laminating direction to each other within the varistor element body 111. Therefore, a region functioning as the varistor B exists at a position corresponding to the connecting conductor 141 in the varistor element body 111. Consequently, the connecting conductors 141 function as a mark for identifying the mounting direction of the multilayer chip varistor 101, whereby the multilayer chip varistor 101 can be mounted appropriately and easily.

In the second embodiment, the varistor element body 111 has a square form when seen in a direction perpendicular to the first and second main faces 113, 115. In this case, the mounting direction of the multilayer chip varistor 101 is hard to identify according to the outer form of the varistor element body 111. Therefore, it will be particularly effective if the connecting conductor 141 functioning as a mark is arranged on the first main face 113.

Since the connecting conductors function as a mark, the second embodiment has no need to provide the varistor element body 111 with a mark for identifying the mounting direction of the multilayer chip varistor 101. As a result, the manufacturing cost of the multilayer chip varistor 101 does not increase.

In the second embodiment, the varistor element body 111 contains Pr and Ca, while the electroconductive paste for forming the connecting conductors 141 and terminal electrodes 150 (first and second terminal electrodes 151, 152) contains Pt. The connecting conductors 141 and terminal electrodes 150 (first and second terminal electrodes 151, 152) are formed by applying the electroconductive paste for forming the connecting conductors 141 and terminal electrodes 150 (first and second terminal electrodes 151, 152) onto the varistor element body 111 and baking them. These can improve the bonding strength between the varistor element body 111 and the connecting conductors 141 and terminal electrodes 150 (first and second terminal electrodes 151, 152).

The effect of improving the bonding strength between the varistor element body 111 and the connecting conductors 141 and terminal electrodes 150 (first and second terminal electrodes 151, 152) seems to result from the following phenomenon at the time of baking the electroconductive paste. When baking the electroconductive paste onto the varistor element body 111, Pr and Ca contained in the varistor element body 111 migrate to the vicinity of the surface of the varistor element body 111, i.e., the vicinity of the interface between the varistor element body 111 and electroconductive paste. Then, Pr and Ca migrated to the vicinity of the interface between the varistor element body 111 and electroconductive paste and Pt contained in the electroconductive paste diffuse into each other. When Pr and Ca and Pt diffuse into each other, a compound of Pr and Pt and a compound of Ca and Pt may be formed in the vicinity of the interface (including the interface) between the varistor element body 111 and the connecting conductors 141 and terminal electrodes 150 (first and second terminal electrodes 151, 152). These compounds cause an anchor effect, thereby improving the bonding strength between the varistor element body 111 and the connecting conductors 141 and terminal electrodes 150 (first and second terminal electrodes 151, 152).

The terminal electrodes 150 (first and second terminal electrodes 151, 152) containing Pt are suitable mainly when mounting the multilayer chip varistor 101 to an external substrate or the like by solder reflow, and can improve solder leach resistance and solderability.

Modified Example of Second Embodiment

Figure 22:
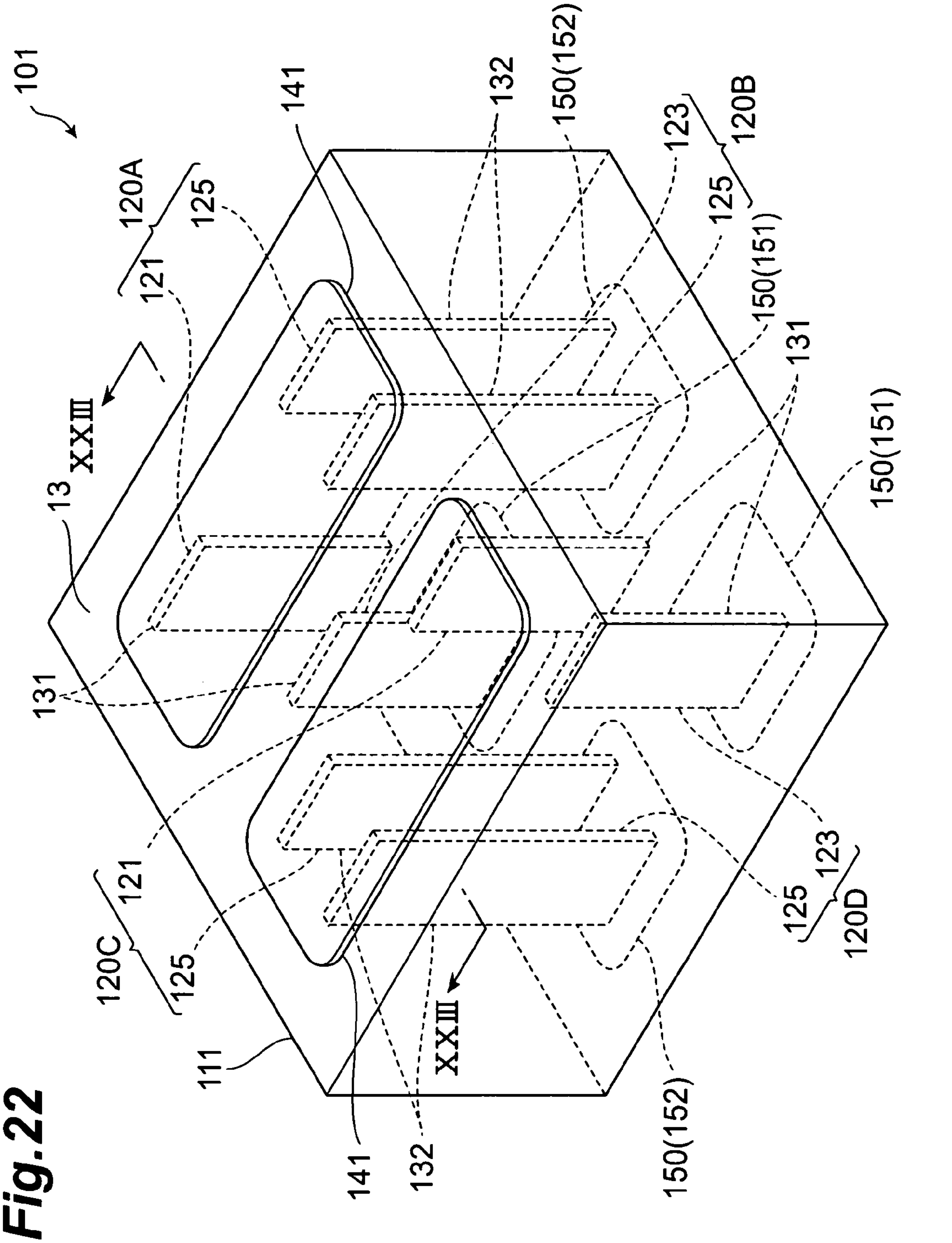
FIG. 22 is a perspective view showing the multilayer chip varistor in accordance with a modified example of the second embodiment.
Figure 23:
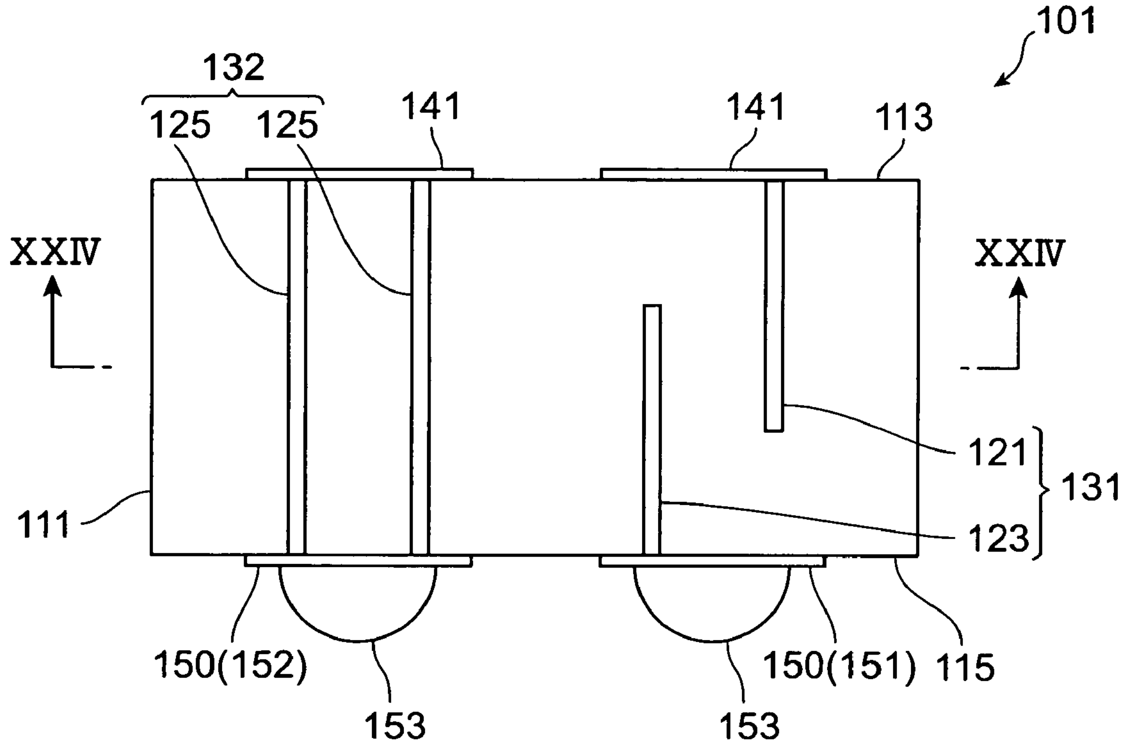
FIG. 23 is a sectional view taken along the line XXIII-XXIII of FIG. 22.
Figure 24:
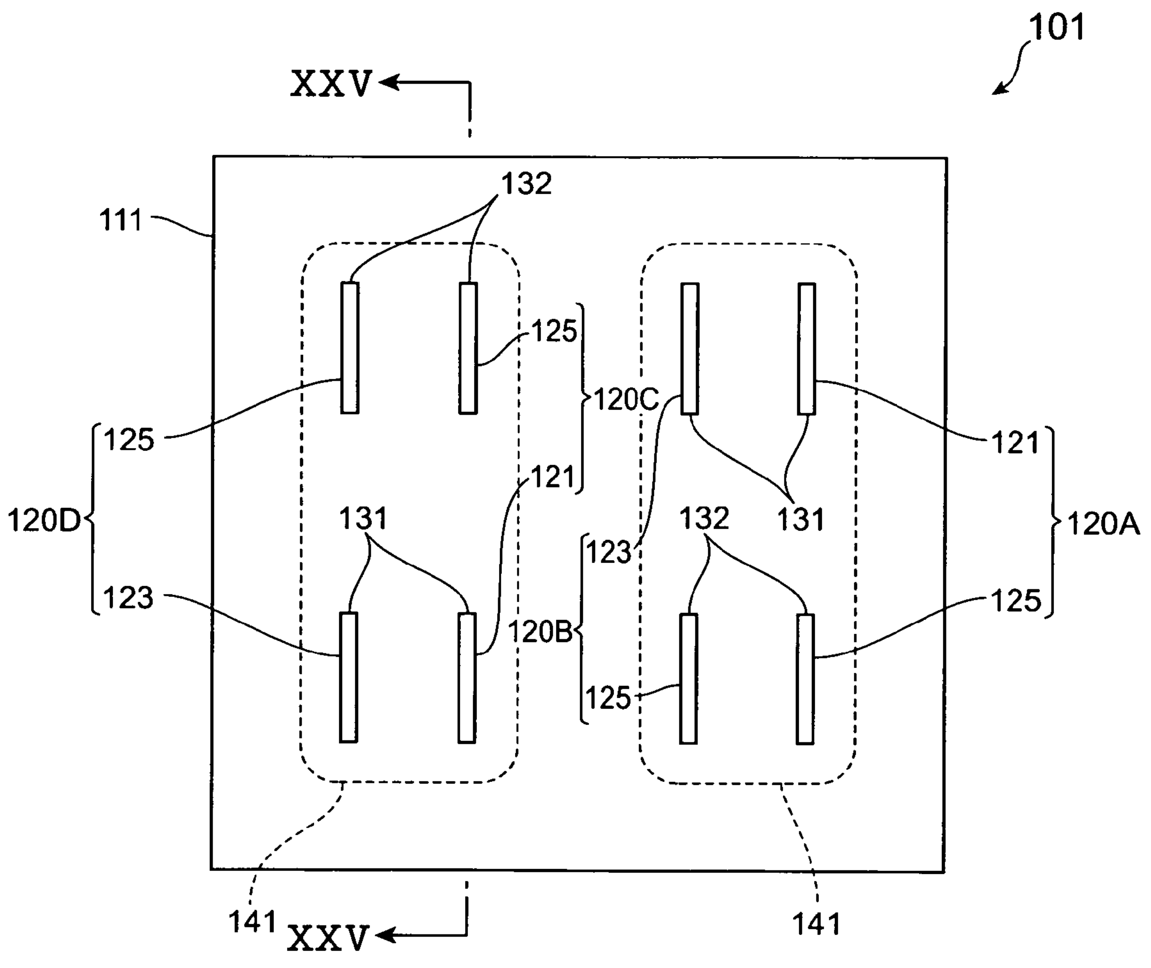
FIG. 24 is a sectional view taken along the line XXIV-XIV of FIG. 23.
Figure 25:
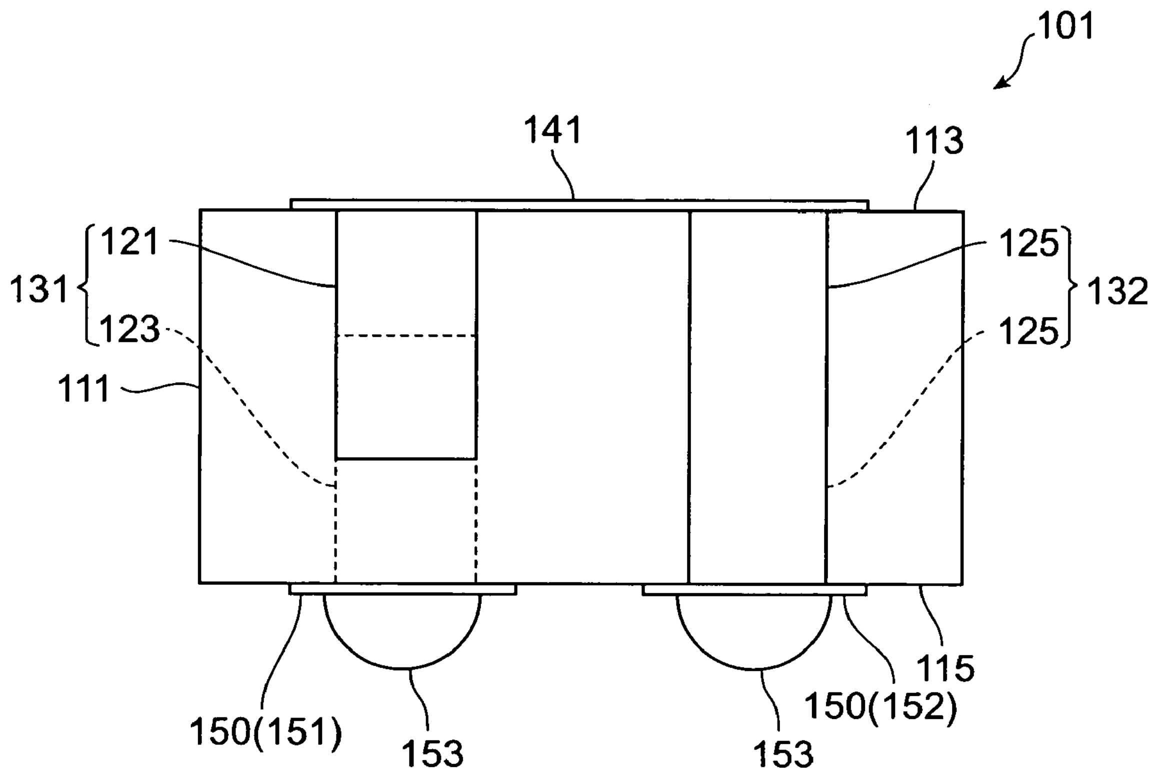
FIG. 25 is a sectional view taken along the line XXV-XXV of FIG. 24.

The structure of the multilayer chip varistor 101 in accordance with a modified example of the second embodiment will now be explained with reference to FIGS. 22 to 25. FIG. 22 is a perspective view showing the multilayer chip varistor in accordance with the modified example of the second embodiment. FIG. 23 is a sectional view taken along the line XXIII-XXIII of FIG. 22. FIG. 24 is a sectional view taken along the line XXIV-XXIV of FIG. 23. FIG. 25 is a sectional view taken along the line XXV-XXV of FIG. 24.

Figure 26:
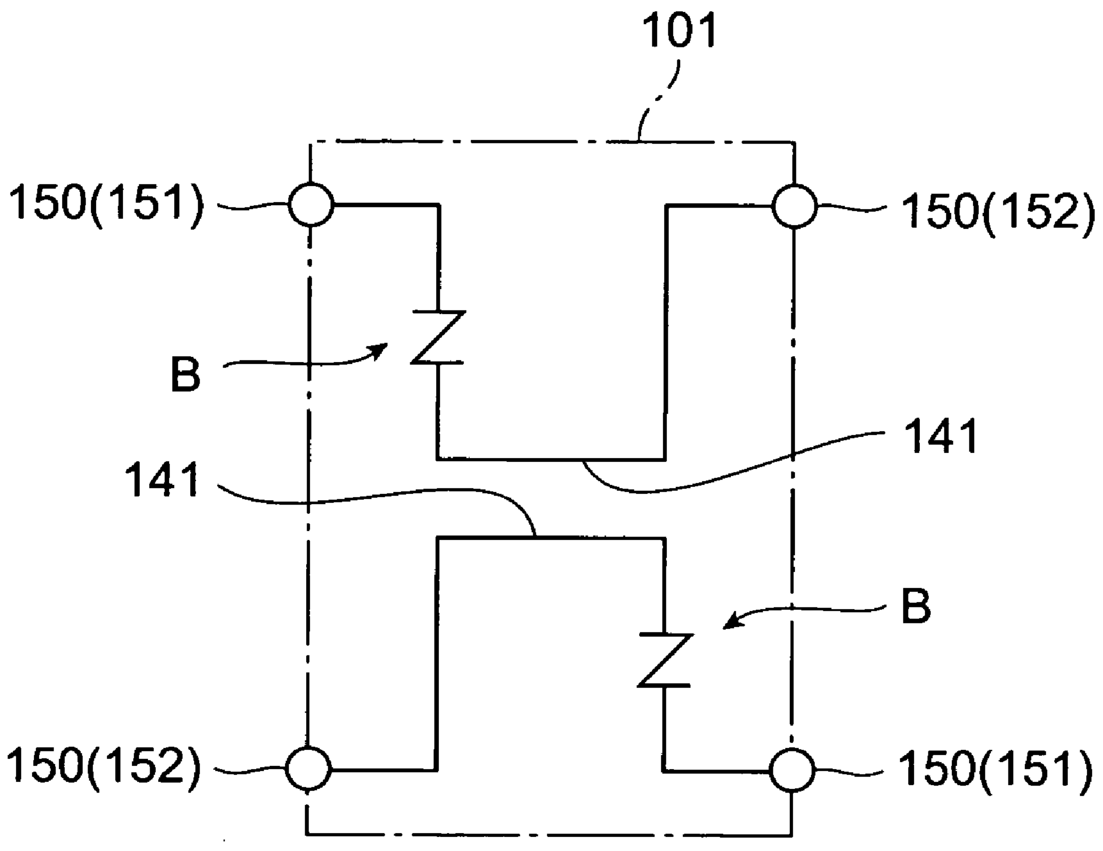
FIG. 26 is a diagram for explaining an equivalent circuit of the multilayer chip varistor in accordance with the modified example of the second embodiment.

In the multilayer chip varistor 101 in accordance with the modified example, as shown in FIGS. 22 to 25, each connecting conductor 141 is arranged on the first main face 113 so as to electrically connect the first inner electrode 121 included in the inner electrode pair 131 and the inner conductors 125 included in the inner conductor pair 132 to each other in the inner electrode pair 131 and inner conductor pair 132 arranged in a row in a direction substantially perpendicular to the laminating direction (i.e., a direction substantially parallel to varistor layers) within the varistor element body 111. The connecting conductor 141 extends in a direction substantially perpendicular to the laminating direction. Therefore, as shown in FIG. 26, each varistor B exists between a pair of first and second terminal electrodes 151, 152 arranged in a row in the longer-side direction of the connecting conductor 141.

The numbers of inner electrode pairs and inner conductor pairs are not restricted to 2 each, for example, in the second embodiment. Namely, as long as there is a set of the inner electrode pair 131 and inner conductor pair 132, their numbers may be either 1 or 3 or more each.

It will be sufficient if the connecting conductor 141 and second terminal electrode 152 are electrically connected to each other by the inner conductor 125. Therefore, the connecting conductor 141 and second terminal electrode 152 may be electrically connected to each other by one inner conductor 125 in addition to the inner conductor pair 132 including one inner conductor 125 as in the second embodiment and modified example. The connecting conductor 141 and second terminal electrode 152 may also be electrically connected to each other by three or more inner conductors 125.

The connecting conductor 141 and first terminal electrode 151 may be electrically connected to each other by two or more inner electrode pairs 131 as well. Namely, though each varistor B has a structure in which one first inner electrode 121 and one second inner electrode 123 hold a varistor layer therebetween in the multilayer chip varistors 101 in accordance with the second embodiment and modified example, it is not restrictive. Each varistor B may have a structure in which a plurality of first inner electrodes 121 and a plurality of second inner electrodes 123 hold varistor layers therebetween.

The inner electrode pairs 131 or inner conductor pairs 132 may be positioned in a row in the laminating direction or in a direction substantially perpendicular to the laminating direction. Namely, the first terminal electrodes 151 or second terminal electrodes 152 may be adjacent to each other in the row or column direction.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A varistor element comprising:

a varistor element body having first and second main faces opposing each other;

a plurality of inner electrode pairs having first and second inner electrodes disposed within the varistor element body so as to oppose each other at least partly;

a plurality of varistors included in the varistor element body, each varistor construed by one of the first inner electrodes and one of the second inner electrodes;

a connecting conductor arranged on the first main face so as to electrically connect the first inner electrodes of a predetermined inner electrode pair in the plurality of inner electrode pairs to each other, the connecting conductor connecting two of the plurality of varistors in series; and a plurality of terminal electrodes arranged on the second main face so as to correspond to the second inner electrodes of the plurality of inner electrode pairs and electrically connect with the second inner electrodes, wherein the first inner electrode is led to the first main face, the portion thereof led to the first main face being connected to the connecting conductor physically and electrically, and wherein the second inner electrode is led to the second main face, the portion thereof led to the second main face being connected to the terminal electrode physically and electrically.

2. A varistor element according to claim 1, wherein the varistor element body has a square form when seen in a direction perpendicular to the first and second main faces.

3. A varistor element according to claim 1, wherein the plurality of terminal electrodes are two-dimensionally arranged in n rows by n columns, where n is an even number of 2 or greater.

4. A varistor element according to claim 1, wherein a varistor layer formed with the first inner electrode and a varistor layer formed with the second inner electrode are laminated in the varistor element body; and wherein the first and second main faces extend in a direction parallel to the laminating direction of the varistor layers and perpendicular to the first and second inner electrodes.

5. A varistor element comprising:

a varistor element body having first and second main faces opposing each other;

an inner electrode pair having first and second inner electrodes disposed within the varistor element body so as to oppose each other at least partly;

an inner conductor arranged within the varistor element body;

a connecting conductor arranged on the first main face so as to electrically connect the first inner electrode in the inner electrode pair to the inner conductor;

a first terminal electrode arranged on the second main face so as to electrically connect with the second inner electrode; and a second terminal electrode arranged on the second main face so as to electrically connect with the inner conductor, wherein the first inner electrode and one end of the inner conductor are led to the first main face, the portions thereof led to the first main surface being connected to the connecting conductor physically and electrically;

wherein the second inner electrode is led to the second main face, the portion thereof led to the second main face being connected to the first terminal electrode physically and electrically, and wherein the other end of the inner conductor is led to the second main face, the portion thereof led to the second main face being connected to the second terminal electrode physically and electrically.

6. A varistor element according to claim 5, wherein the varistor element body has a square form when seen in a direction perpendicular to the first and second main faces.

7. A varistor element according to claim 5, wherein the plurality of terminal electrodes are two-dimensionally arranged in n rows by n columns, where n is an even number of 2 or greater, and are alternately arranged in the row direction and in the column direction.

8. A varistor element according to claim 5, wherein the varistor element body is a multilayer body in which a plurality of varistor layers formed with the first and second inner electrodes and inner conductor are laminated; and wherein the first and second main faces expand in a direction extending along the laminating direction of the varistor layers and intersecting with the first and second inner electrodes and inner conductor.

9. A varistor element comprising:

a varistor element body having first and second main faces opposing each other;

an inner electrode pair having first and second inner electrodes disposed within the varistor element body so as to oppose each other at least partly;

a pair of inner conductors arranged within the varistor element body;

a connecting conductor arranged on the first main face so as to electrically connect the first inner electrode in the inner electrode pair to the pair of inner conductors;

a first terminal electrode arranged on the second main face so as to electrically connect with the second inner electrode; and a second terminal electrode arranged on the second main face so as to electrically connect with the pair of inner conductors, wherein the first inner electrode and first ends of the inner conductors are led to the first main face, the portions thereof led to the first main surface being connected to the connecting conductor physically and electrically, wherein the second inner electrode is led to the second main face, the portion thereof led to the second main face being connected to the first terminal electrode physically and electrically, wherein second ends of the inner conductors are led to the second main face, the portions thereof led to the second main face being connected to the second terminal electrode physically and electrically, and wherein the first and second terminal electrodes are two-dimensionally arranged in 2 rows by 2 columns and are alternately arranged in the row direction and in the column direction.

* * * * *